(12) United States Patent
Elshafie et al.

(10) Patent No.: US 12,170,995 B2
(45) Date of Patent: Dec. 17, 2024

(54) RESOURCE GAPS FOR FULL-DUPLEX COMMUNICATIONS BASED ON UPLINK AND DOWNLINK WAVEFORMS

(71) Applicant: QUALCOMM Incorporated, San Diego, CA (US)

(72) Inventors: Ahmed Elshafie, San Diego, CA (US); Hung Dinh Ly, San Diego, CA (US); Muhammad Sayed Khairy Abdelghaffar, San Jose, CA (US)

(73) Assignee: QUALCOMM Incorporated, San Diego, CA (US)

( * ) Notice: Subject to any disclaimer, the term of this patent is extended or adjusted under 35 U.S.C. 154(b) by 363 days.

(21) Appl. No.: 17/572,361

(22) Filed: Jan. 10, 2022

(65) Prior Publication Data

US 2023/0224894 A1    Jul. 13, 2023

(51) Int. Cl.
| | |
|---|---|
| *H04W 72/04* | (2023.01) |
| *H04L 5/14* | (2006.01) |
| *H04W 72/0446* | (2023.01) |
| *H04W 72/0453* | (2023.01) |
| *H04W 72/1268* | (2023.01) |
| *H04W 72/20* | (2023.01) |

(52) U.S. Cl.
CPC .......... *H04W 72/1268* (2013.01); *H04L 5/14* (2013.01); *H04W 72/0446* (2013.01); *H04W 72/0453* (2013.01); *H04W 72/20* (2023.01)

(58) Field of Classification Search
CPC ......... H04W 72/1268; H04W 72/0446; H04W 72/0453; H04W 72/20; H04W 72/23; H04L 5/14; H04L 27/0008; H04L 5/0048; H04L 5/0094; H04L 27/2636; H04L 5/0007
See application file for complete search history.

(56) References Cited

U.S. PATENT DOCUMENTS

| | | | |
|---|---|---|---|
| 2019/0182813 A1* | 6/2019 | Yamamoto | H04L 5/0007 |
| 2023/0189315 A1* | 6/2023 | Haustein | H04W 24/02 370/252 |
| 2024/0022386 A1* | 1/2024 | Bhamri | H04L 5/14 |

OTHER PUBLICATIONS

Moderator (NTT Docomo, Inc, R1-21109722, Oct. 2021).*
International Search Report and Written Opinion—PCT/US2023/060176—ISA/EPO—May 8, 2023.
(Continued)

*Primary Examiner* — Lakeram Jangbahadur
(74) *Attorney, Agent, or Firm* — Guang Y. Zhang; Holland & Hart LLP

(57) ABSTRACT

Methods, systems, and devices for wireless communications are described. A user equipment (UE) may receive a control message from a base station indicating a configuration of an uplink waveform for full-duplex communications at the UE. The UE may receive an additional control message scheduling a set of uplink resources and a set of downlink resources for the full-duplex communications. The set of uplink resources and the set of downlink resources may at least partially overlap in a time-domain. A frequency-domain gap between the set of uplink resources and the set of downlink resources may be based on the first uplink waveform and a first downlink waveform used by the base station. The UE may communicate with the base station on the set of uplink resources and the set of downlink resources in accordance with the frequency-domain gap.

30 Claims, 17 Drawing Sheets

(56) References Cited

OTHER PUBLICATIONS

Moderator (NTT Docomo): "Summary on Rel-17 TEIs", 3GPP TSG RAN WG1 #106bis-e, R1-2109722, 3rd Generation Partnership Project (3GPP), Mobile Competence Centre, 650, Route Des Lucioles, F-06921 Sophia-Antipolis Cedex, France, vol. RAN WG1, No. e-Meeting, Oct. 11, 2021-Oct. 19, 2021, 99 Pages, Oct. 21, 2021, XP052065826, p. 79-p. 80.
Vivo: "Email Discussion Summary for [RAN-R18-WS-eMBB-vivo]", 3GPP TSG RAN Rel-18 workshop, RWS-210546, 3rd Generation Partnership Project (3GPP), Mobile Competence Centre, 650, Route Des Lucioles, F-06921 Sophia-Antipolis Cedex, France, vol. RAN WG3, No. Electronic Meeting, Jun. 28, 2021-Jul. 2, 2021, 44 Pages, Jun. 25, 2021, XP052029019, p. 15.

\* cited by examiner

Uplink Waveform Configuration 220

Resource Indication 225

Uplink Time-Frequency Resources 230

Downlink Time-Frequency Resources 235

Full Duplex Communications 240

Frequency-Domain Gap Configuration 245

RESOURCE GAPS FOR FULL-DUPLEX COMMUNICATIONS BASED ON UPLINK AND DOWNLINK WAVEFORMS

FIELD OF TECHNOLOGY

The following relates to wireless communications, including resource gaps for full-duplex communications based on uplink and downlink waveforms.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

SUMMARY

The described techniques relate to improved methods, systems, devices, and apparatuses that support resource gaps for full-duplex communications based on uplink and downlink waveforms. Generally, the described techniques provide for wireless devices to communicate using full-duplex communications (e.g., simultaneous transmission and reception) in accordance with a frequency-domain gap between resources configured for reception and resources configured for transmission, where the frequency-domain gap is based on a waveform pair including respective waveforms used at each wireless device. For example, a base station may configure an uplink waveform for a user equipment (UE). The base station may schedule a set of uplink resources and a set of downlink resources for full-duplex communications at the UE. The uplink resources and the downlink resource may at least partially overlap in a time-domain. In some cases, the frequency-domain gap between the set of uplink resources and the set of downlink resources may be based on the configured uplink waveform at the UE and a downlink waveform used by the base station. The base station and the UE may communicate on the set of uplink resources and the set of downlink resources in accordance with the frequency-domain gap.

A method for wireless communication at a user equipment (UE) is described. The method may include receiving, from a base station, a first control message indicating a configuration of a first uplink waveform to be used by the UE for full-duplex communications, receiving, from the base station, a second control message scheduling a set of uplink resources and a set of downlink resources for the full-duplex communications, the set of uplink resources and the set of downlink resources at least partially overlapping in a time domain, where a frequency-domain gap between the set of uplink resources and the set of downlink resources is based on the first uplink waveform and a first downlink waveform used by the base station, and communicating with the base station on the set of uplink resources and the set of downlink resources in accordance with the frequency-domain gap.

An apparatus for wireless communication at a UE is described. The apparatus may include a memory and a processor coupled to the memory and configured to cause the apparatus to receive, from a base station, a first control message indicating a configuration of a first uplink waveform to be used by the UE for full-duplex communications, receive, from the base station, a second control message scheduling a set of uplink resources and a set of downlink resources for the full-duplex communications, the set of uplink resources and the set of downlink resources at least partially overlapping in a time domain, where a frequency-domain gap between the set of uplink resources and the set of downlink resources is based on the first uplink waveform and a first downlink waveform used by the base station, and communicate with the base station on the set of uplink resources and the set of downlink resources in accordance with the frequency-domain gap.

Another apparatus for wireless communication at a UE is described. The apparatus may include means for receiving, from a base station, a first control message indicating a configuration of a first uplink waveform to be used by the UE for full-duplex communications, means for receiving, from the base station, a second control message scheduling a set of uplink resources and a set of downlink resources for the full-duplex communications, the set of uplink resources and the set of downlink resources at least partially overlapping in a time domain, where a frequency-domain gap between the set of uplink resources and the set of downlink resources is based on the first uplink waveform and a first downlink waveform used by the base station, and means for communicating with the base station on the set of uplink resources and the set of downlink resources in accordance with the frequency-domain gap.

A non-transitory computer-readable medium storing code for wireless communication at a UE is described. The code may include instructions executable by a processor to receive, from a base station, a first control message indicating a configuration of a first uplink waveform to be used by the UE for full-duplex communications, receive, from the base station, a second control message scheduling a set of uplink resources and a set of downlink resources for the full-duplex communications, the set of uplink resources and the set of downlink resources at least partially overlapping in a time domain, where a frequency-domain gap between the set of uplink resources and the set of downlink resources is based on the first uplink waveform and a first downlink waveform used by the base station, and communicate with the base station on the set of uplink resources and the set of downlink resources in accordance with the frequency-domain gap.

Some examples of the method, apparatuses, and non-transitory computer-readable medium described herein may further include operations, features, means, or instructions for receiving, from the base station, a third control message indicating a configuration of a respective frequency-domain gap for each waveform pair of a set of two or more waveform pairs, each waveform pair including an uplink waveform and a downlink waveform and identifying the frequency-domain gap associated with the first uplink waveform and the first downlink waveform based on the configuration of the respective frequency-domain gap for each waveform pair.

Some examples of the method, apparatuses, and non-transitory computer-readable medium described herein may further include operations, features, means, or instructions for identifying the frequency-domain gap associated with the first uplink waveform and the first downlink waveform based on a predefined configuration of a respective frequency-domain gap for each waveform pair of a set of two or more waveform pairs, each waveform pair including an uplink waveform and a downlink waveform.

In some examples of the method, apparatuses, and non-transitory computer-readable medium described herein, the first uplink waveform and the first downlink waveform include a same waveform type, the set of uplink resources and the set of downlink resources fully overlapping in the time domain.

In some examples of the method, apparatuses, and non-transitory computer-readable medium described herein, the first uplink waveform includes a first waveform type that may be different from a second waveform type of the first downlink waveform, the set of uplink resources overlapping with a portion of the set of downlink resources in the time domain.

In some examples of the method, apparatuses, and non-transitory computer-readable medium described herein, communicating with the base station may include operations, features, means, or instructions for transmitting one or more repetitions of a physical uplink channel on the set of uplink resources that partially overlap with the set of downlink resources in the time domain.

Some examples of the method, apparatuses, and non-transitory computer-readable medium described herein may further include operations, features, means, or instructions for modifying the first uplink waveform to a second uplink waveform different from the first uplink waveform based on the first uplink waveform and the first downlink waveform.

Some examples of the method, apparatuses, and non-transitory computer-readable medium described herein may further include operations, features, means, or instructions for receiving, from the base station, a message including an indication to modify the first uplink waveform to the second uplink waveform, where modifying the first uplink waveform to a second uplink waveform may be based on the indication.

In some examples of the method, apparatuses, and non-transitory computer-readable medium described herein, the message may be received before modifying the first uplink waveform to the second uplink waveform based on a time duration before communicating with the base station.

Some examples of the method, apparatuses, and non-transitory computer-readable medium described herein may further include operations, features, means, or instructions for receiving, from the base station, a fourth control message that indicates a configuration of the time duration, where the fourth control message includes a radio resource control (RRC) message, or a medium access control-control element (MAC-CE), or any combination thereof.

In some examples of the method, apparatuses, and non-transitory computer-readable medium described herein, the time duration may be based on a capability of the UE to modify the first uplink waveform to the second uplink waveform.

In some examples of the method, apparatuses, and non-transitory computer-readable medium described herein, the first uplink waveform may be modified to the second uplink waveform based on a pathloss of a channel between the UE and the base station for the full-duplex communications satisfying a threshold value.

In some examples of the method, apparatuses, and non-transitory computer-readable medium described herein, the first uplink waveform may be modified to the second uplink waveform based on the frequency-domain gap and a transmission power used for communicating with the base station.

In some examples of the method, apparatuses, and non-transitory computer-readable medium described herein, the first uplink waveform includes a single-carrier-type waveform or a cyclic-prefix (CP)-orthogonal frequency-division multiplexing (OFDM)-type waveform and the first downlink waveform includes the single-carrier-type waveform or the CP-OFDM-type waveform.

In some examples of the method, apparatuses, and non-transitory computer-readable medium described herein, the single-carrier-type waveform includes a discrete Fourier transform (DFT)-spread-OFDM (DFT-s-OFDM) waveform.

A method for wireless communication at a base station is described. The method may include transmitting, to a UE, a first control message indicating a configuration of a first uplink waveform to be used by the UE for full-duplex communications, transmitting, to the UE, a second control message scheduling a set of uplink resources and a set of downlink resources for the full-duplex communications, the set of uplink resources and the set of downlink resources at least partially overlapping in a time domain, where a frequency-domain gap between the set of uplink resources and the set of downlink resources is based on the first uplink waveform and a first downlink waveform used by the base station, and communicating with the UE on the set of uplink resources and the set of downlink resources in accordance with the frequency-domain gap.

An apparatus for wireless communication at a base station is described. The apparatus may include a memory and a processor coupled to the memory and configured to cause the apparatus to transmit, to a UE, a first control message indicating a configuration of a first uplink waveform to be used by the UE for full-duplex communications, transmit, to the UE, a second control message scheduling a set of uplink resources and a set of downlink resources for the full-duplex communications, the set of uplink resources and the set of downlink resources at least partially overlapping in a time domain, where a frequency-domain gap between the set of uplink resources and the set of downlink resources is based on the first uplink waveform and a first downlink waveform used by the base station, and communicate with the UE on the set of uplink resources and the set of downlink resources in accordance with the frequency-domain gap.

Another apparatus for wireless communication at a base station is described. The apparatus may include means for transmitting, to a UE, a first control message indicating a configuration of a first uplink waveform to be used by the UE for full-duplex communications, means for transmitting, to the UE, a second control message scheduling a set of uplink resources and a set of downlink resources for the full-duplex communications, the set of uplink resources and the set of downlink resources at least partially overlapping in a time domain, where a frequency-domain gap between the set of uplink resources and the set of downlink resources is based on the first uplink waveform and a first downlink waveform used by the base station, and means for communicating with the UE on the set of uplink resources and the set of downlink resources in accordance with the frequency-domain gap.

A non-transitory computer-readable medium storing code for wireless communication at a base station is described. The code may include instructions executable by a processor to transmit, to a UE, a first control message indicating a configuration of a first uplink waveform to be used by the UE for full-duplex communications, transmit, to the UE, a second control message scheduling a set of uplink resources and a set of downlink resources for the full-duplex communications, the set of uplink resources and the set of downlink resources at least partially overlapping in a time domain, where a frequency-domain gap between the set of uplink resources and the set of downlink resources is based on the first uplink waveform and a first downlink waveform used by the base station, and communicate with the UE on the set of uplink resources and the set of downlink resources in accordance with the frequency-domain gap.

Some examples of the method, apparatuses, and non-transitory computer-readable medium described herein may further include operations, features, means, or instructions for transmitting, to the UE, a third control message indicating a configuration of a respective frequency-domain gap for each waveform pair of a set of two or more waveform pairs, each waveform pair including an uplink waveform and a downlink waveform, where the frequency-domain gap associated with the first uplink waveform and the first downlink waveform may be based on the configuration of the respective frequency-domain gap for each waveform pair.

In some examples of the method, apparatuses, and non-transitory computer-readable medium described herein, the first uplink waveform and the first downlink waveform include a same waveform type, the set of uplink resources and the set of downlink resources fully overlapping in the time domain.

In some examples of the method, apparatuses, and non-transitory computer-readable medium described herein, the first uplink waveform includes a first waveform type that may be different from a second waveform type of the first downlink waveform, the set of uplink resources overlapping with a portion of the set of downlink resources in the time domain.

In some examples of the method, apparatuses, and non-transitory computer-readable medium described herein, communicating with the UE may include operations, features, means, or instructions for receiving one or more repetitions of a physical uplink channel on the set of uplink resources that partially overlap with the set of downlink resources in the time domain.

Some examples of the method, apparatuses, and non-transitory computer-readable medium described herein may further include operations, features, means, or instructions for modifying the first downlink waveform to a second downlink waveform different from the first downlink waveform based on the first uplink waveform and the first downlink waveform.

Some examples of the method, apparatuses, and non-transitory computer-readable medium described herein may further include operations, features, means, or instructions for measuring a pathloss for a channel between the base station and the UE associated with the full-duplex communications and determining that the pathloss satisfies a threshold value, where modifying the first downlink waveform to a second downlink waveform may be based on the pathloss satisfying the threshold value.

In some examples of the method, apparatuses, and non-transitory computer-readable medium described herein, the first downlink waveform may be modified to the second downlink waveform based on a power headroom report of the UE.

Some examples of the method, apparatuses, and non-transitory computer-readable medium described herein may further include operations, features, means, or instructions for transmitting, to the UE, a message including an indication to modify the first uplink waveform to a second uplink waveform different from the first uplink waveform based on the first uplink waveform and the first downlink waveform being different waveform types, the second uplink waveform including a same waveform type as the first downlink waveform.

In some examples of the method, apparatuses, and non-transitory computer-readable medium described herein, the message may be transmitted before the first uplink waveform may be modified to the second uplink waveform based on a time duration before communicating with the UE and the method, apparatuses, and non-transitory computer-readable medium may include further operations, features, means, or instructions for transmitting, to the UE, a fourth control message that indicates a configuration of the time duration, where the fourth control message includes a RRC message, or a MAC-CE, or any combination thereof.

DETAILED DESCRIPTION

Figure 1:
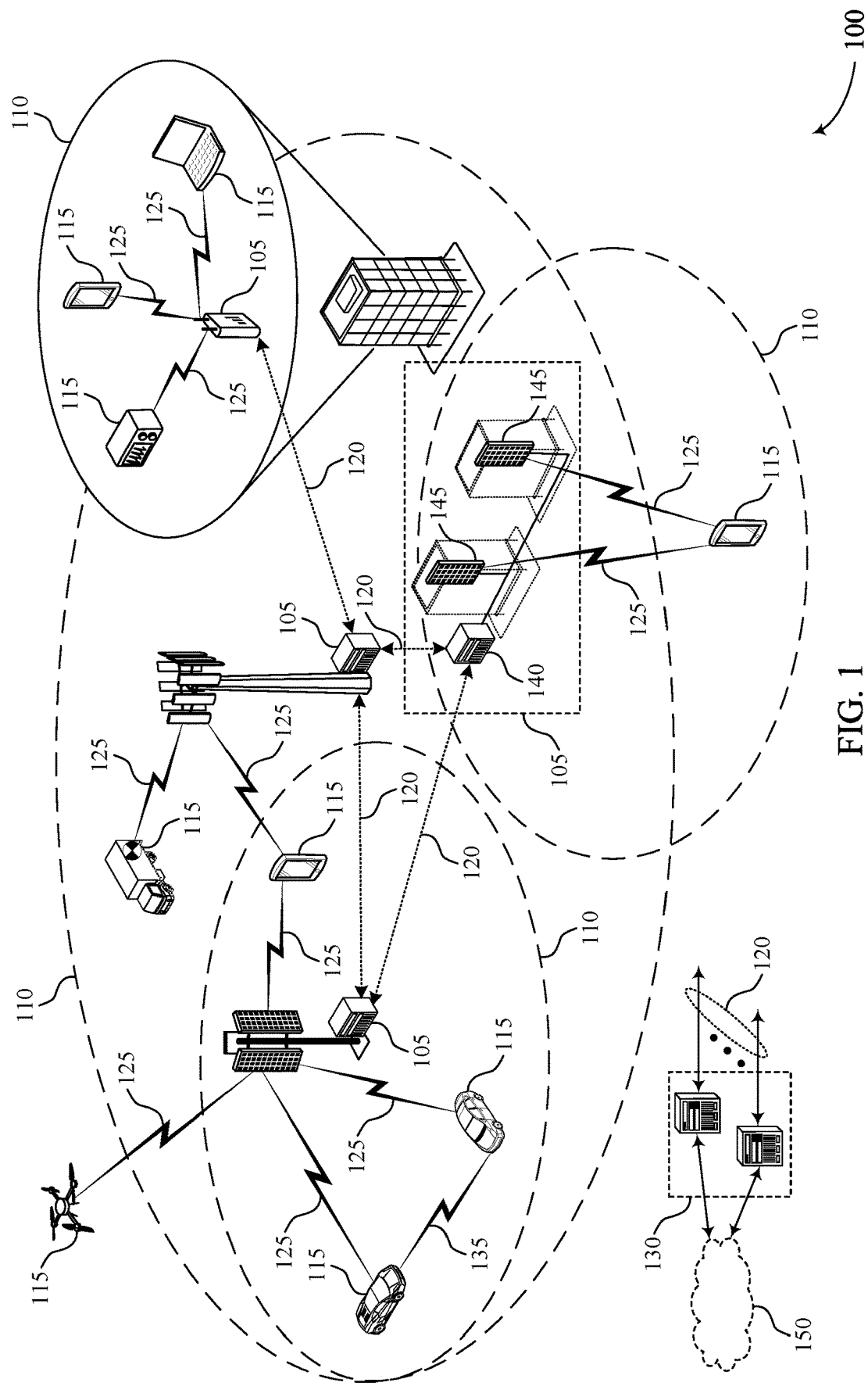
FIGS. 1 and 2 illustrate examples of wireless communications systems that support resource gaps for full-duplex communications based on uplink and downlink waveforms in accordance with aspects of the present disclosure.

In some wireless communications systems, different types of waveforms may be used for uplink and downlink transmissions. For example, uplink transmissions by a user equipment (UE) may use either a cyclic-prefix orthogonal frequency-division multiplexing (CP-OFDM) waveform or a single-carrier waveform (e.g., a discrete Fourier transform-spread-OFDM (DFT-s-OFDM) waveform). Downlink transmissions by a base station may also use CP-OFDM or single-carrier waveforms. In cases of full-duplex communications, however, the use of different waveforms for simultaneous uplink and downlink transmissions may affect the full-duplex communications. Specifically, full-duplex communication may utilize a slot structure that includes uplink and downlink resources that overlap in time, but are separated by a guard band (e.g., a frequency-domain gap), which may be referred to as sub-band full-duplex. In some cases, differences in the CP-OFDM waveform and the DFT-s-OFDM waveform may result in some non-linearity or leakage between respective uplink and downlink subbands. As a result, different uplink and downlink waveforms may negatively impact full-duplex communications.

As described herein, one or more wireless devices may modify a full-duplex slot structure to avoid issues caused by the waveforms used in uplink and downlink resources that overlap in the time-domain. For example, a size of a guard band (e.g., the frequency-domain gap) between full-duplex uplink and downlink resources may be based on the uplink and downlink waveform used by a UE and a base station, respectively. In such cases, a frequency-domain gap may be defined for each waveform pairing (e.g., CP-OFDM in uplink and CP-OFDM in downlink, DFT-s-OFDM in uplink and CP-OFDM in downlink, and so forth) that is possible for the UE and base station, and the frequency-domain gap used for the full-duplex communications may be selected based on the uplink and downlink waveform pair. As an example, in cases where the uplink waveform used by the UE and the downlink waveform used by the base station cause leakage or other issues with simultaneous uplink and downlink transmissions, then the frequency-domain gap (e.g., the guard band) may have a size that prevents or minimizes such leakage or issues. Likewise, in cases where the respective waveforms used by the UE and base station result in relatively minimal issues with the simultaneous uplink and downlink transmissions, then the frequency-domain gap may be a different (e.g., relatively smaller) size.

In some examples, the base station and the UE may modify an uplink waveform, downlink waveform, or both. In some cases, the uplink and downlink waveforms may be configured to be the same for full-duplex communications. In other examples, the waveforms may be modified or changed based on the pathloss of the channel between the UE and base station or other factors, such as the frequency-domain gap and a transmission power used by the UE. In some cases, the base station may signal a change of the uplink waveform before an uplink transmission. Here, the signaling may be provided some time period before the transmission is scheduled to occur or some time period before the transmission is scheduled, or both, where the time period may be configured based on a capability of the UE to change waveforms.

Aspects of the disclosure are initially described in the context of wireless communications systems. Aspects of the disclosure are further described in the context of resource diagrams and process flows. Aspects of the disclosure are further illustrated by and described with reference to apparatus diagrams, system diagrams, and flowcharts that relate to resource gaps for full-duplex communications based on uplink and downlink waveforms.

FIG. 1 illustrates an example of a wireless communications system 100 that supports resource gaps for full-duplex communications based on uplink and downlink waveforms in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

In some examples, one or more components of the wireless communications system 100 may operate as or be referred to as a network node. As used herein, a network node may refer to any UE 115, base station 105, entity of a core network 130, apparatus, device, or computing system configured to perform any techniques described herein. For example, a network node may be a UE 115. As another example, a network node may be a base station 105. As another example, a first network node may be configured to communicate with a second network node or a third network node. In one aspect of this example, the first network node may be a UE 115, the second network node may be a base station 105, and the third network node may be a UE 115. In another aspect of this example, the first network node may be a UE 115, the second network node may be a base station 105, and the third network node may be a base station 105. In yet other aspects of this example, the first, second, and third network nodes may be different. Similarly, reference to a UE 115, a base station 105, an apparatus, a device, or a computing system may include disclosure of the UE 115, base station 105, apparatus, device, or computing system being a network node. For example, disclosure that a UE 115 is configured to receive information from a base station 105 also discloses that a first network node is configured to receive information from a second network node. In this example, consistent with this disclosure, the first network node may refer to a first UE 115, a first base station 105, a first apparatus, a first device, or a first computing system configured to receive the information; and the second network node may refer to a second UE 115, a second base station 105, a second apparatus, a second device, or a second computing system.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time-domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time-domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, for example, in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the RRC (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

Wireless communications system 100 may support guard bands for full-duplex communications that are based on respective waveforms used by different wireless devices (e.g., by two or more different UEs 115 communicating with each other, by a UE 115 and a base station 105 communicating with each other, or the like). In some cases, a wireless device, such as a base station 105 or a UE 115, may configure another wireless device with an uplink waveform format for full-duplex configuration. For example, the base station 105 may transmit control signaling to the UE 115 including a control message with an uplink waveform configuration, a control message with a resource indication, a control message indicating a frequency-domain gap configuration, or a combination thereof. The base station may transmit the control messages via RRC signaling, a MAC-CE (MAC-CE), or the like. The base station 105 may use a downlink waveform format for downlink communications, which, in some cases, may be based on configuring the uplink waveform format at the UE 115. In some examples, the resource indication may schedule a set of uplink time-frequency resources and downlink time-frequency resources for the full-duplex communications at the UE 115. The uplink time-frequency resources may at least partially overlap in the time-domain with downlink time-frequency resources. The base station 105 and the UE 115 may transmit and receive full-duplex communications using uplink time-frequency resources and downlink time-frequency resources according to the frequency-domain gap. In some examples, a wireless device may modify (e.g., change, adjust) a waveform for communications based on the waveform used by another wireless device, based on a transmission power, based on one or more metrics associated with the channel between the devices, or the like.

Figure 2:
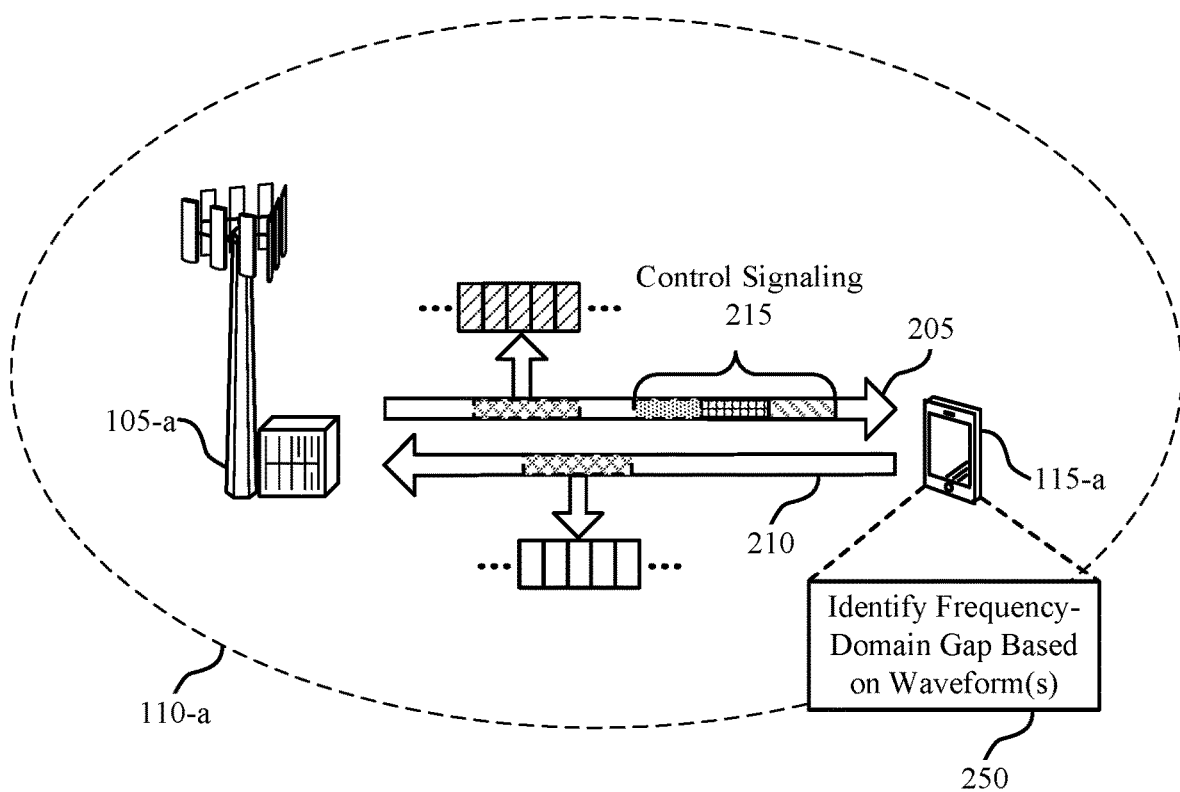
Figure 2:
Figure 2:
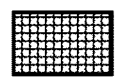
Figure 2:
Figure 2:
Figure 2:
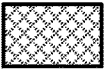
Figure 2:
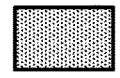

FIG. 2 illustrates an example of a wireless communications system 200 that supports resource gaps for full-duplex communications based on uplink and downlink waveforms in accordance with aspects of the present disclosure. In some examples, wireless communications system 200 may implement aspects of wireless communications system 100 and may include a UE 115-*a* and a base station 105-*a* with a coverage area 110-*a*, which may be examples of a UE 115 and a base station 105 with a coverage area 110 as described with reference to FIG. 1. Base station 105-*a* may communicate control information, data, or both with UE 115-*a* using a downlink communication link 205. Similarly, UE 115-*a* may communicate control information, data, or both with base station 105-*a* using an uplink communication link 210. In some examples, base station 105-*a*, UE 115-*a*, or both may perform full-duplex communications according to a frequency-domain gap between uplink and downlink resources (e.g., time-frequency resources), where the frequency-domain gap is based on one or more waveforms.

In some cases, the actions described as being performed by a base station 105 may additionally or alternatively be performed by a UE 115, such as a UE 115 acting as a controlling UE 115 for sidelink communications. Similarly, the actions described as being performed by a UE 115 may additionally or alternatively be performed by a base station 105. The term wireless device may refer to either one of a UE 115, a base station 105, or any other device with wireless transmitting and receiving capabilities. In addition, the waveforms described herein are provided as examples and should not be considered limiting to the scope of the claims or the disclosure. For example, wireless devices such as UE 115-*a* and/or base station 105-*a* may implement the described techniques using one or more different waveforms that are not explicitly described herein, and the described examples are provided for illustrative purposes.

In some examples, base station 105-a, UE 115-a, or both may support full-duplex communications. For example, base station 105-a, UE 115-a, or both may transmit and receive data concurrently via uplink communication link 210 and downlink communication link 205. There may be different types of full-duplex communication, such as in-band full-duplex (IBFD) and sub-band FDD, which may be referred to as flexible duplex. For IBFD, a wireless device may transmit and receive on a same time and frequency resource. That is, a downlink transmission and an uplink transmission may share at least a portion of a same time and frequency resource. The resources for the downlink transmission may partially or fully overlap with the resources for the uplink transmission. For sub-band FDD, the wireless device may transmit and receive at a same time but on one or more different frequency resources. In some cases, the downlink resources may be separated from the uplink resources in a frequency-domain.

In some examples, full-duplex communication may provide for a wireless device, such as a base station 105 and/or UE 115, to increase a bandwidth (e.g., twice the bandwidth) by transmitting and receiving on a same set of time-frequency resources. However, transmitting and receiving on a same set of time-frequency resources may cause interference at the wireless device. The wireless device may utilize sub-band full-duplex (SBFD) techniques to reduce or prevent interference resulting from transmitting and receiving simultaneously (e.g., self-interference between uplink and downlink communications at the wireless device), base station-to-base station interference, UE-to-UE interference, or the like. For SBFD, a wireless device may budget gaps across downlink and uplink resources. The gaps may be referred to as guard bands, frequency-domain gaps, or the like. The gaps may reduce self-interference while improving latency and uplink coverage, which is described in further detail with respect to FIG. 3.

In some examples, a wireless device may communicate according to a waveform format. The waveform format, which may be referred to as a waveform configuration, may be configured at the wireless device for uplink, downlink, or both. In some cases, the waveform format may include CP-OFDM, which may have a relatively high signal-to-noise ratio, relatively high spectral efficiency, a relatively high order MIMO, and the like to achieve a correspondingly high data rate. A wireless device may support a CP-OFDM waveform for relatively high frequency bands (e.g., Frequency Range 4 (FR4) including 2-10 GHz and beyond). The CP-OFDM waveform may be backward compatible with one or more lower frequency range waveforms (e.g., Frequency Range 1 (FR1) including 4.1-7.125 GHz, Frequency Range 2 including 24.25-52.6 GHz, Frequency Range 2x including 52.6-71 GHz, and the like). The CP-OFDM waveform may offer relatively high spectral efficiency for scenarios where energy efficiency conditions may be relaxed. To facilitate frequency-domain equalization, the wireless device may introduce a CP to create OFDM-like blocks or symbols. In some examples, the wireless device may consider a guard interval (GI), which may be a known sequence, as a special case of a CP for creating the OFDM-like blocks or symbols.

In some other cases, the waveform format may include a single carrier waveform, such as DFT-s-OFDM or single carrier-quadrature amplitude modulation (SC-QAM), which may have a relatively low peak-to-average-power ratio (PAPR), may be single-layer, and the like, to achieve a power-efficient transmission. A wireless device may use a single-carrier waveform for scenarios with relatively high energy efficiency conditions. For example, a lower PAPR may directly correlate to a higher power amplifier efficiency, which may reduce power consumption at the wireless device. In some cases, to implement a DFT-s-OFDM waveform for a frequency-domain, the wireless device may perform frequency-domain transform precoding at a transmitter and frequency-domain equalization at a receiver. The DFT-s-OFDM waveform may have relatively flexible bandwidth allocation, which may provide for the wireless device to support a large bandwidth. To implement a SC-QAM waveform for a time-domain, the wireless device may perform time-domain filtering (e.g., pulse shaping filters at a transmitter, matched filtering at the receiver, time-domain equalization at the receiver, or the like). The wireless device may use a guard band to provide for bandwidth growth by time-domain filtering.

In some examples, a wireless device, such as a base station 105, a UE 115, or both, may support multiple single carrier waveforms for downlink communications (e.g., SC-QAM and DFT-s-OFDM). A UE 115 or base station 105 may switch from a waveform type to a different waveform type based on pathloss. For example, the UE 115 may measure pathloss, and may switch from a CP-OFDM waveform to a DFT-s-OFDM waveform based on the measured pathloss exceeding a threshold (e.g., being above an upper bound). By switching from the CP-OFDM waveform to the DFT-s-OFDM waveform, the UE 115 may reduce the power consumption at the UE 115 because the CP-OFDM waveform may increase a PAPR value. The base station 105 and UE 115 may support the CP-OFDM waveform or the DFT-s-OFDM, such that the base station 105 and UE 115 may use any combination of the CP-OFDM waveform and the DFT-s-OFDM waveform (e.g., the base station 105 and the UE 115 use the CP-OFDM waveform, the base station 105 uses the CP-OFDM waveform while the UE 115 uses the DFT-s-OFDM waveform, the base station 105 and the UE 115 uses the DFT-s-OFDM waveform, or the base station 105 uses the DFT-s-OFDM waveform while the UE 115 uses the CP-OFDM waveform).

In some cases, such as for SBFD, a gap between the transmission resources (e.g., time-frequency resources) and reception resources may depend on which waveform the wireless device uses for transmission and reception. Additionally or alternatively, for both SBFD and IBFD, aligning both waveforms for uplink and downlink communications may reduce interference. In some examples, there may be a difference in power spectral density between a single carrier and CP-OFDM waveform. A power spectral density leakage may depend on a non-linearity of an uplink waveform on the transmission side. Since CP-OFDM and single carrier waveforms may have different characteristics, the amount of non-linearity or leakage to a downlink subband may also be different for a same transmit power. The size of a guard band, or frequency-domain gap, may affect the leakage. Thus, a wireless device may use a different guard-band (e.g., a different size guard band) for downlink and uplink waveforms depending on the type of the waveform. For example, a single carrier waveform may result in relatively lower leakage and different non-linearity characteristics than CP-OFDM, and the corresponding guard band for full-duplex communications may be relatively smaller.

In some aspects, wireless devices may communicate using full-duplex communications (e.g., simultaneous transmission and reception) in accordance with a frequency-domain gap between resources configured for reception and resources configured for transmission, where the frequency-domain gap is based on a waveform pair including respective waveforms used at each wireless device. In some cases, a wireless device, such as base station 105-*a*, may configure another wireless device, such as UE 115-*a*, with an uplink waveform for full-duplex configuration. For example, base station 105-*a* may transmit control signaling 215 to UE 115-*a*. The control signaling may include a control message with an uplink waveform configuration 220. Base station 105-*a* may transmit the control message via RRC signaling, a MAC-CE or the like. The uplink waveform configuration 220 may indicate a waveform type for UE 115-*a* to use for uplink communications, such as CP-OFDM, DFT-s-OFDM, SC-QAM, or the like. Base station 105-*a* may use a downlink waveform type for downlink communications based on configuring the uplink waveform configuration 220 at UE 115-*a*.

Base station 105-*a* may transmit another control message in the control signaling 215 including a resource indication 225. The resource indication 225 may schedule a set of uplink time-frequency resources 230 and downlink time-frequency resources 235 for the full-duplex communications 240 at UE 115-*a*. The uplink time-frequency resources 230 may at least partially overlap in the time-domain with downlink time-frequency resources 235. In some examples, base station 105-*a* may include the resource indication 225 in same control signaling 215 as the uplink waveform configuration 220, such as in RRC signaling, a same MAC-CE, or the like. In some other examples, base station 105-*a* may include the resource indication 225 in different RRC signaling, a different MAC-CE, or the like.

In some examples, a guard band, or frequency gap, between the uplink time-frequency resources 230 and the downlink time-frequency resources 235 may be a function of the configured uplink waveform and the downlink waveform used by base station 105-*b*, which may be referred to as a waveform pair for uplink and downlink signals or channels. In particular, the guard band width (e.g., frequency resources allotted to the guard band) may change for different waveform pairs. That is, the guard band may have a different size (e.g., span a different quantity of subcarriers) based on the respective waveforms used for communications between devices (e.g., between a UE 115 and another UE 115, between a UE 115 and a base station 105). As an example, the size of the guard band may be based on the uplink waveform used by the UE 115 and the downlink waveform used by the base station 105, and the size of the guard band may be modified if the uplink waveform or the downlink waveform, or both, are modified. In some cases, UE 115-*a* may receive the control signaling 215 in an RRC configuration, and may have time to consider an appropriate frequency gap between the uplink time-frequency resources 230 and the downlink time-frequency resources 235. In RRC signaling, base station 105-*a* may define the frequency gap associated with each waveform pair. Once base station 105-*a* and UE 115-*a* decide on a waveform pair, UE 115-*a* and base station 105-*a* may use a corresponding frequency gap for the full-duplex communications 240.

In some cases, for full-duplex, base station 105-*a* may configure UE 115-*a* with a same waveform format or type for full-duplex symbols in uplink and downlink signals. In some other examples, base station 105-*a* and UE 115-*a* may be preconfigured to use the same waveform format. Using a same uplink waveform format for uplink and downlink (e.g., in full-duplex communications) may increase efficiency for joint processing of downlink and uplink communications at UE 115-*a*, improve performance (e.g., by using demodulation reference signals (DMRSs) to estimate self-interference), and the like. In some examples, UE 115-*a* may use different uplink and downlink waveform formats for uplink control channel (e.g., physical uplink control channel (PUCCH)) and uplink shared channel (e.g., physical uplink shared channel (PUSCH)) repetitions, where at least one of the repetitions overlaps with one or more full-duplex symbols. Similarly, UE 115-*a* may use different uplink and downlink waveform formats for partial overlapping between downlink and uplink symbols (e.g., some symbols of a PUSCH overlap with downlink full-duplex symbols).

In some examples, base station 105-*a* may transmit a frequency-domain gap configuration 245 indicating a frequency-domain gap for each waveform pairs. Base station 105-*a* may include the frequency-domain gap configuration 245 in the control signaling 215, such as in a same message including the uplink waveform configuration 220, the resource indication 225, or both. Additionally or alternatively, base station 105-*a* may include the frequency-domain gap configuration 245 in a different message than the uplink waveform configuration 220 and the resource indication 225. Base station 105-*a* may indicate the frequency-domain gap configuration 245 to UE 115-*a* in RRC signaling, a MAC-CE, or the like. In some cases, at 250, UE 115-*a* may identify the frequency-domain gap that is based on the uplink waveform and downlink waveform. In some examples, the frequency-domain gap is based on the frequency-domain gap configuration 245. In some other cases, at 250, UE 115-*a* may identify the frequency-domain gap for the uplink waveform and downlink waveform based on a defined configuration of a respective frequency-domain gap for each waveform pair. A set of configurations including the configuration may be predefined or otherwise configured at UE 115-*a*.

In some cases, UE 115-*a* may use a same waveform format as base station 105-*a*, such that a pathloss provides for a threshold transmit power to be satisfied. That is, UE 115-*a* may use the same waveform format as base station 105-*a*, such as CP-OFDM, if switching to CP-OFDM from DFT-s-OFDM or SC-QAM keeps a PAPR value below a threshold supported by the communication conditions at UE 115-*a*. In some other cases, based on scheduling and pathlosses, base station 105-*a* may switch a downlink waveform format at base station 105-*a* based on a waveform format of one or more UEs 115, or may change the downlink waveform format at base station 105-*a* and uplink waveform formats at one or more UEs 115. In some examples, UE 115-*a* may change waveform format autonomously according to a guard band or frequency-domain gap and power condition at UE 115-*a*. If UE 115-*a* autonomously changes a guard band or frequency-domain gap, base station 105-*a* may determine the waveform format at UE 115-*a* based on a power headroom report, pathloss measurement at base station 105-*b*, report from UE 115-*a* including an indication of the guard band, or the like.

In some examples, base station 105-*a* may indicate the switch between waveforms a time duration, or threshold time, before the full-duplex communications 240. Base station 105-*a* may configure the time duration at UE 115-*a* via RRC signaling, a MAC-CE, or the like. The time duration may be based on a capability of UE 115-*a* to switch between the two transmit waveform formats. In some cases, UE 115-*a* may indicate the capability to switch between waveform formats to base station 105-*a*. The time duration may include a number of symbols.

Base station 105-*a* and UE 115-*a* may transmit and receive full-duplex communications 240. For example, UE 115-*a* may send an uplink transmission to base station 105-*a* using uplink time-frequency resources 230, while receiving a downlink transmission from base station 105-*a* using downlink time-frequency resources 235.

Figure 3:
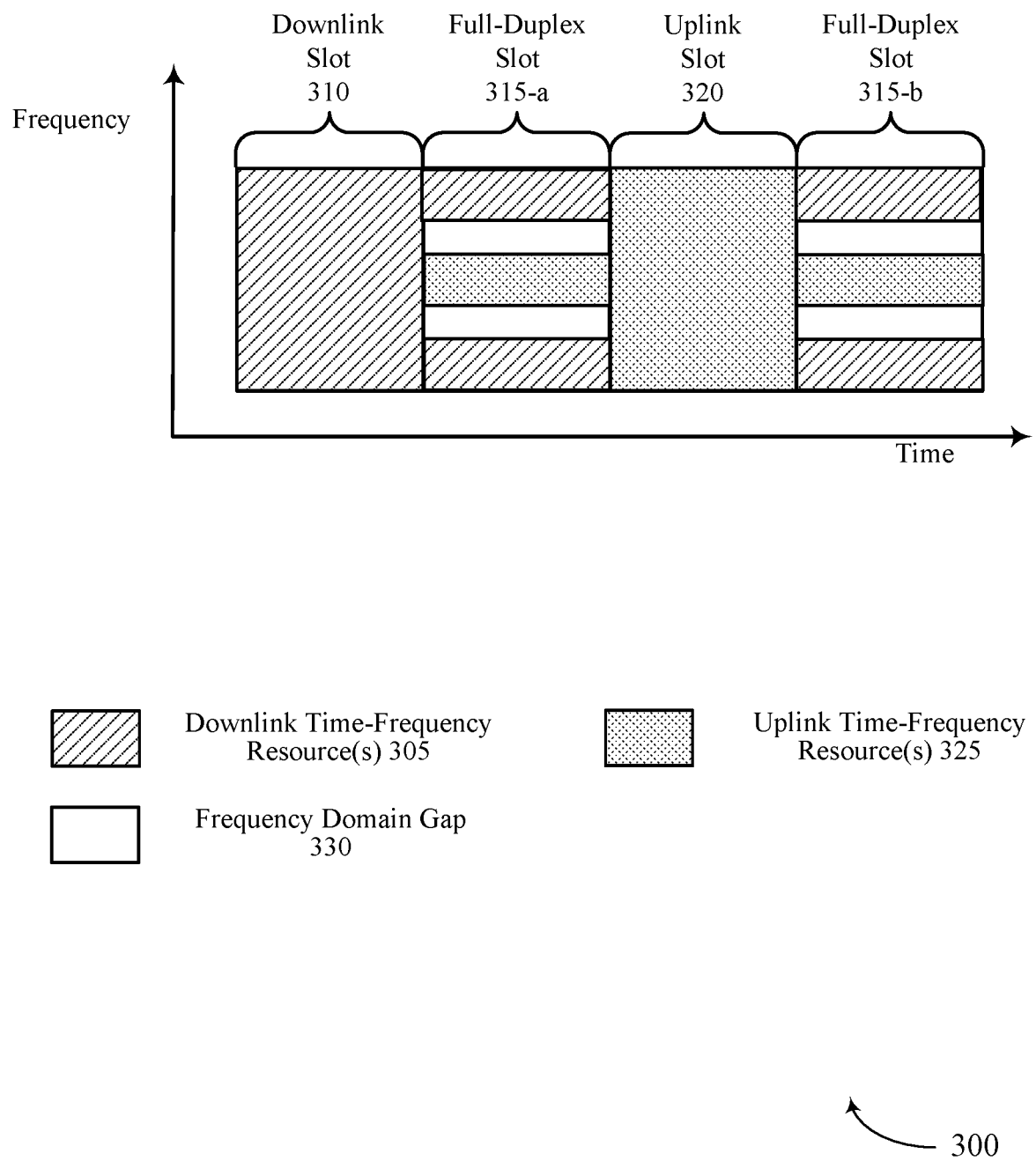
FIG. 3 illustrates an example of a resource diagram that supports resource gaps for full-duplex communications based on uplink and downlink waveforms in accordance with aspects of the present disclosure.

FIG. 3 illustrates an example of a resource diagram 300 that supports resource gaps for full-duplex communications based on uplink and downlink waveforms in accordance with aspects of the present disclosure. In some examples, resource diagram 300 may implement aspects of wireless communications system 100 and wireless communications system 200. For example, one or more wireless devices may implement resource diagram 300 by performing full-duplex communications according to a frequency-domain gap related to a waveform pair configured at the wireless devices.

In some examples, resource diagram 300 illustrates an example of one or more uplink time-frequency resources and one or more downlink time-frequency resources used by a wireless device for full-duplex communication. For example, a base station 105 or UE 115, as described with reference to FIGS. 1 and 2, may transmit and receive messages concurrently. The wireless device may receive a message from another wireless device on one or more downlink time-frequency resources 305 within a downlink slot 310. A slot may be a period in time dedicated to a transmission. There may be downlink slots 310 for downlink communications, full-duplex slots 315 for uplink and downlink communications, and uplink slots 320 for uplink communications. For example, full-duplex slot 315-*a* and full-duplex slot 315-*b* may include uplink frequency resources and downlink frequency resources over a same duration. The wireless device may receive an uplink message from another wireless device on one or more uplink time-frequency resources 325 and a downlink message on one or more downlink time-frequency resources 305 that overlap with the uplink time-frequency resources 325 within full-duplex slot 315-*a*. Similarly, the wireless device may receive an uplink message from another wireless device on one or more uplink time-frequency resources 325 and a downlink message on one or more downlink time-frequency resources 305 that overlap with the uplink time-frequency resources 325 within full-duplex slot 315-*b*. In some cases, the wireless device may receive an uplink message from another wireless device on one or more uplink time-frequency resources 325 within an uplink slot 320.

In some cases, as described with reference to FIG. 2, a wireless device may perform full-duplex communications on a set of partially or fully overlapping uplink time-frequency resources 325 and downlink time-frequency resources 305 according to a frequency-domain gap 330. The frequency-domain gap 330 may correspond to a waveform pair (e.g., including a first waveform used at a first device and a second waveform used at a second device). That is, each waveform pair may have a configured frequency-domain gap 330. For example, if a base station uses a CP-OFDM waveform for downlink communication to a UE and the UE uses a DFT-s-OFDM waveform for simultaneous uplink communication to the base station, the waveform pair may be CP-OFDM for downlink and DFT-s-OFDM for uplink. The base station and the UE may be configured with a frequency-domain gap 330 for the CP-OFDM downlink and DFT-s-OFDM uplink waveform pair. In another example, the base station may use the DFT-s-OFDM waveform for downlink communication to a UE and the UE may use the DFT-s-OFDM waveform for simultaneous uplink communication to the base station, the waveform pair may be DFT-s-OFDM for downlink and DFT-s-OFDM for uplink. The frequency-domain gap 330 may be configured for the DFT-s-OFDM downlink and DFT-s-OFDM uplink waveform pair, which may be a different frequency-domain gap 330 than the frequency-domain gap 330 associated with the CP-OFDM downlink and DFT-s-OFDM uplink waveform pair. In some examples, the frequency-domain gap 330 that corresponds to respective waveform pairs may be preconfigured or may be configured using signaling (e.g., RRC signaling) between the base station and the UE.

Figure 4:
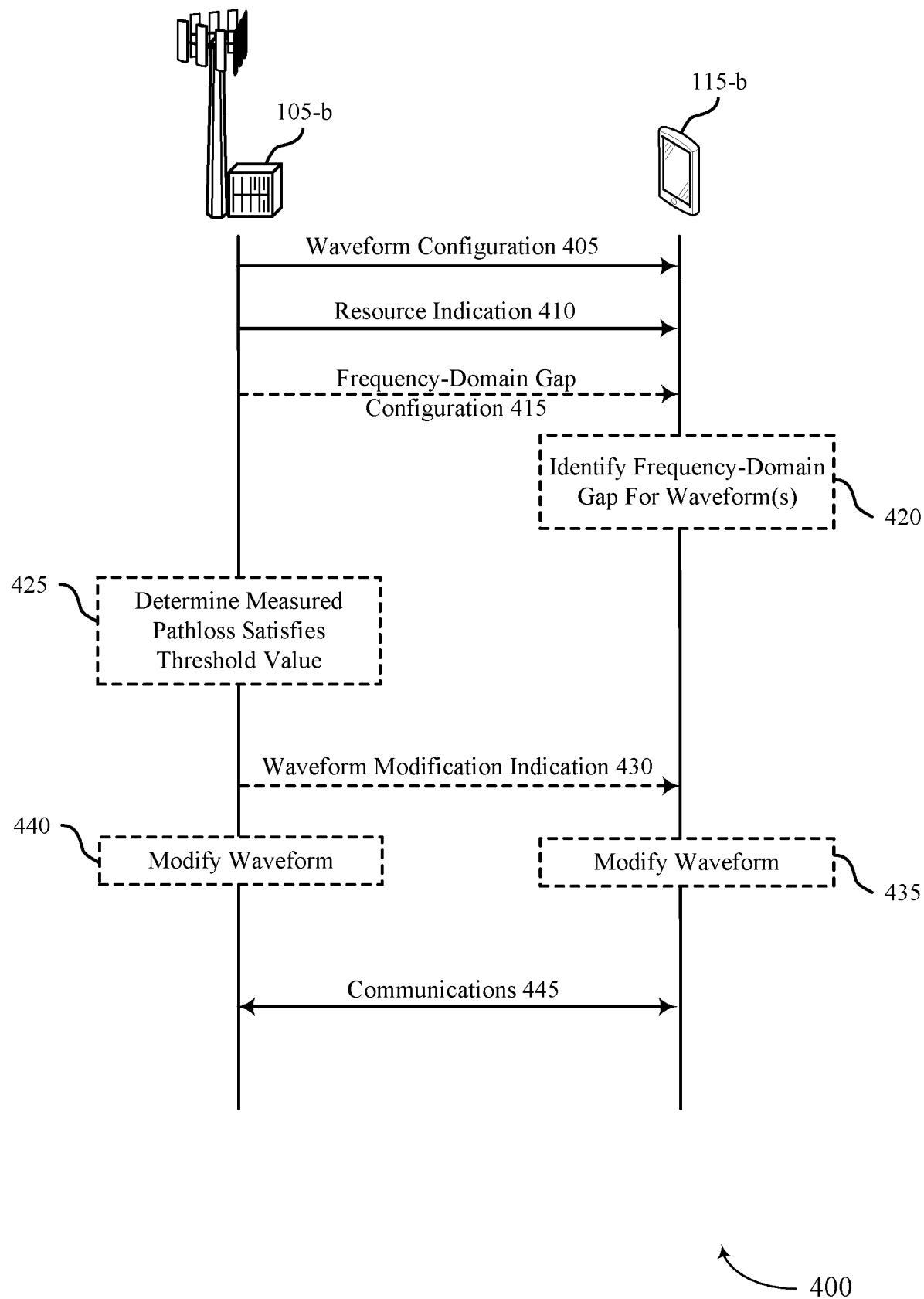
FIG. 4 illustrates an example of a process flow in a system that supports resource gaps for full-duplex communications based on uplink and downlink waveforms in accordance with aspects of the present disclosure.

FIG. 4 illustrates an example of a process flow 400 in a system that supports resource gaps for full-duplex communications based on uplink and downlink waveforms in accordance with aspects of the present disclosure. In some examples, process flow 400 may implement aspects of wireless communications system 100, wireless communications system 200, and resource diagram 300. The process flow 400 may illustrate an example of a base station 105-*b* indicating a waveform configuration and resources to a UE 115-*b* for performing full-duplex communication in accordance with a frequency-domain gap related to the waveform configuration. Base station 105-*b* and UE 115-*b* may be examples of a base station 105 and a UE 115 as described with reference to FIGS. 1 and 2. Alternative examples of the following may be implemented, where some processes are performed in a different order than described or are not performed. In some cases, processes may include additional features not mentioned below, or further processes may be added.

In some cases, the actions described as being performed by a base station 105 may additionally or alternatively be performed by a UE 115, such as a UE 115 acting as a controlling UE 115 for sidelink communications. Similarly, the actions described as being performed by a UE 115 may additionally or alternatively be performed by a base station 105.

At 405, UE 115-*b* may receive a control message from base station 105-*b* indicating a configuration for an uplink waveform. UE 115-*b* may use the uplink waveform for full-duplex communications. A waveform may also be referred to as a waveform type, a waveform format, waveform configuration, or the like.

At 410, UE 115-*b* may receive an additional control message from base station 105-*b* scheduling a set of uplink resources and a set of downlink resources for the full-duplex communications. In some cases, the set of uplink resources and the set of downlink resources may at least partially overlap in a time-domain. A frequency-domain gap between the set of uplink resources and the set of downlink resources may be based on the first uplink waveform and a first downlink waveform used by base station 105-*b*.

In some cases, the uplink waveform and the downlink waveform may be a same waveform type. The set of uplink resources and the set of downlink resources may fully overlap in the time-domain.

In some other cases, the uplink waveform may be a different type than a waveform type of the downlink waveform. The set of uplink resources may partially overlap with the set of downlink resources in the time-domain.

At 415, UE 115-*b* may receive an additional control message from base station 105-*b* indicating a configuration of a respective frequency-domain gap for each waveform pair of a set of two or more waveform pairs. Each waveform pair may include an uplink waveform and a downlink waveform.

In some cases, base station 105-*b* may transmit the control messages at 405, 410, 415, or a combination thereof together in RRC signaling, a MAC-CE, or the like. In some other cases, base station 105-*b* may transmit the control messages at 405, 410, 415, or a combination thereof separate in independent RRC signaling, MAC-CEs, or the like.

At 420, UE 115-*b* may identify the frequency-domain gap for the first uplink waveform and the first downlink waveform based on the configuration of the respective frequency-domain gap for each waveform pair. Additionally or alternatively, UE 115-*b* may identify the frequency-domain gap for the first uplink waveform and the first downlink waveform based on a defined configuration (e.g., predefined) of a respective frequency-domain gap for each waveform pair of the set of two or more waveform pairs.

At 425, base station 105-*b* may measure a pathloss for a channel between base station 105-*b* and UE 115-*b* for the full-duplex communications. Base station 105-*b* may determine that the pathloss satisfies a threshold value. The threshold value may be related to one or more transmit power conditions at UE 115-*b*.

At 430, UE 115-*b* may receive a message from base station 105-*b* indicating for UE 115-*b* to modify the uplink waveform to another uplink waveform.

At 435, UE 115-*b* may modify the uplink waveform to the other uplink waveform. The waveforms may be different waveforms. UE 115-*b* may modify the uplink waveform based on receiving the indication. UE 115-*b* may receive the message at 430 before modifying the uplink waveform to the other uplink waveform based on a time duration before communicating with base station 105-*b*. In some cases, UE 115-*b* may modify the uplink waveform based on a pathloss of a channel between UE 115-*b* and base station 105-*b* for the full-duplex communications satisfying a threshold value. The threshold value may be configured at base station 105-*b*, may be based on one or more power conditions at UE 115-*b*, or the like. Additionally or alternatively, UE 115-*b* may modify the uplink waveform based on the frequency-domain gap and a transmission power used for communicating with base station 105-*b*.

In some cases, UE 115-*b* may receive a control message that indicates a configuration of the time duration, or a time threshold. Base station 105-*b* may send the message via RRC signaling, a MAC-CE, or the like. The time duration may be based on a capability of UE 115-*b* to modify the uplink waveform to the other uplink waveform. UE 115-*b* may transmit an indication of the capability to modify an uplink waveform to base station 105-*b*.

At 440, base station 105-*b* may modify the downlink waveform to another downlink waveform. The waveforms may be different waveforms. Base station 105-*b* may modify the downlink waveform to the other downlink waveform based on the pathloss satisfying the threshold value. Base station 105-*b* may modify the downlink waveform to the other downlink waveform based on a power headroom report of UE 115-*b*.

At 445, UE 115-*b* and base station 105-*b* may perform full-duplex communications. For example, UE 115-*b* may communicate with base station 105-*b* on the set of uplink resources and the set of downlink resources in accordance with the frequency-domain gap. In some cases, UE 115-*b* may transmit one or more repetitions of an uplink channel (e.g., PUCCH, PUSCH, or both) on the set of uplink resources that partially overlap with the set of downlink resources in the time-domain.

In some examples, the uplink waveform may be a single-carrier-type waveform (e.g., SC-QAM, DFT-s-OFDM, or the like) or a CP-OFDM-type waveform. Similarly, the downlink waveform may be a single-carrier-type waveform or the CP-OFDM-type waveform.

Figure 5:
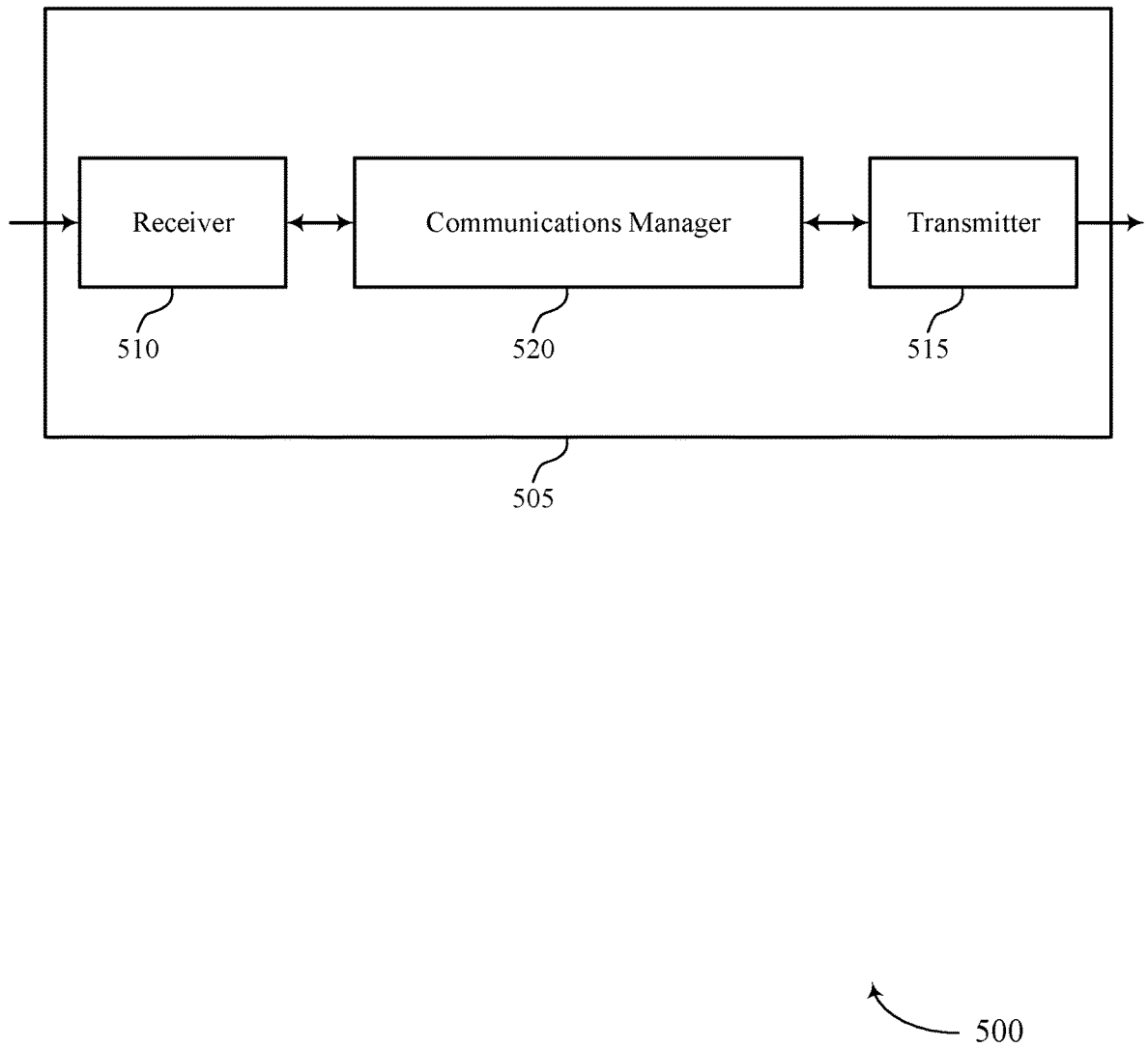
FIGS. 5 and 6 show block diagrams of devices that support resource gaps for full-duplex communications based on uplink and downlink waveforms in accordance with aspects of the present disclosure.

FIG. 5 shows a block diagram 500 of a device 505 that supports resource gaps for full-duplex communications based on uplink and downlink waveforms in accordance with aspects of the present disclosure. The device 505 may be an example of aspects of a UE 115 as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to resource gaps for full-duplex communications based on uplink and downlink waveforms). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to resource gaps for full-duplex communications based on uplink and downlink waveforms). In some examples, the transmitter 515 may be co-located with a receiver 510 in a transceiver module. The transmitter 515 may utilize a single antenna or a set of multiple antennas.

The communications manager 520, the receiver 510, the transmitter 515, or various combinations thereof or various components thereof may be examples of means for performing various aspects of resource gaps for full-duplex communications based on uplink and downlink waveforms as described herein. For example, the communications manager 520, the receiver 510, the transmitter 515, or various combinations or components thereof may support a method for performing one or more of the functions described herein.

In some examples, the communications manager 520, the receiver 510, the transmitter 515, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 520, the receiver 510, the transmitter 515, or various combinations or components thereof may be implemented in code (e.g., as communications management software or firmware) executed by a processor. If implemented in code executed by a processor, the functions of the communications manager 520, the receiver 510, the transmitter 515, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 520 may be configured to perform various operations (e.g., receiving, monitoring, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to receive information, transmit information, or perform various other operations as described herein.

The communications manager 520 may support wireless communication at a UE in accordance with examples as disclosed herein. For example, the communications manager 520 may be configured as or otherwise support a means for receiving, from a base station, a first control message indicating a configuration of a first uplink waveform to be used by the UE for full-duplex communications. The communications manager 520 may be configured as or otherwise support a means for receiving, from the base station, a second control message scheduling a set of uplink resources and a set of downlink resources for the full-duplex communications, the set of uplink resources and the set of downlink resources at least partially overlapping in a time-domain, where a frequency-domain gap between the set of uplink resources and the set of downlink resources is based on the first uplink waveform and a first downlink waveform used by the base station. The communications manager 520 may be configured as or otherwise support a means for communicating with the base station on the set of uplink resources and the set of downlink resources in accordance with the frequency-domain gap.

By including or configuring the communications manager 520 in accordance with examples as described herein, the device 505 (e.g., a processor controlling or otherwise coupled to the receiver 510, the transmitter 515, the communications manager 520, or a combination thereof) may support techniques for a base station to indicate a waveform configuration and resources to a UE for performing full-duplex communication in accordance with a frequency-domain gap related to the waveform configuration, which may cause reduced processing, reduced power consumption, more efficient utilization of communication resources, and the like.

Figure 6:
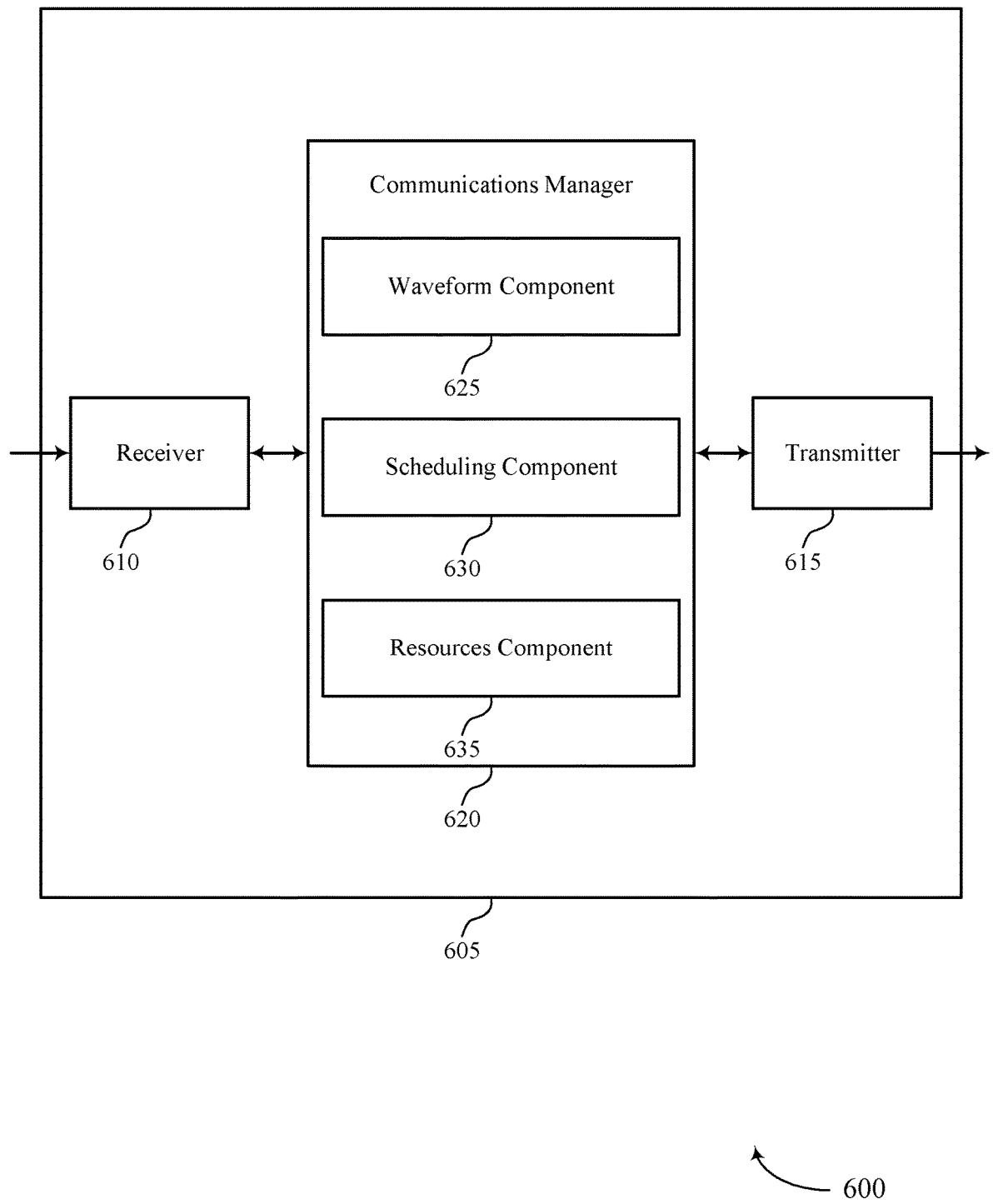

FIG. 6 shows a block diagram 600 of a device 605 that supports resource gaps for full-duplex communications based on uplink and downlink waveforms in accordance with aspects of the present disclosure. The device 605 may be an example of aspects of a device 505 or a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to resource gaps for full-duplex communications based on uplink and downlink waveforms). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to resource gaps for full-duplex communications based on uplink and downlink waveforms). In some examples, the transmitter 615 may be co-located with a receiver 610 in a transceiver module. The transmitter 615 may utilize a single antenna or a set of multiple antennas.

The device 605, or various components thereof, may be an example of means for performing various aspects of resource gaps for full-duplex communications based on uplink and downlink waveforms as described herein. For example, the communications manager 620 may include a waveform component 625, a scheduling component 630, a resources component 635, or any combination thereof. The communications manager 620 may be an example of aspects of a communications manager 520 as described herein. In some examples, the communications manager 620, or various components thereof, may be configured to perform various operations (e.g., receiving, monitoring, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to receive information, transmit information, or perform various other operations as described herein.

The communications manager 620 may support wireless communication at a UE in accordance with examples as disclosed herein. The waveform component 625 may be configured as or otherwise support a means for receiving, from a base station, a first control message indicating a configuration of a first uplink waveform to be used by the UE for full-duplex communications. The scheduling component 630 may be configured as or otherwise support a means for receiving, from the base station, a second control message scheduling a set of uplink resources and a set of downlink resources for the full-duplex communications, the set of uplink resources and the set of downlink resources at least partially overlapping in a time-domain, where a frequency-domain gap between the set of uplink resources and the set of downlink resources is based on the first uplink waveform and a first downlink waveform used by the base station. The resources component 635 may be configured as or otherwise support a means for communicating with the base station on the set of uplink resources and the set of downlink resources in accordance with the frequency-domain gap.

Figure 7:
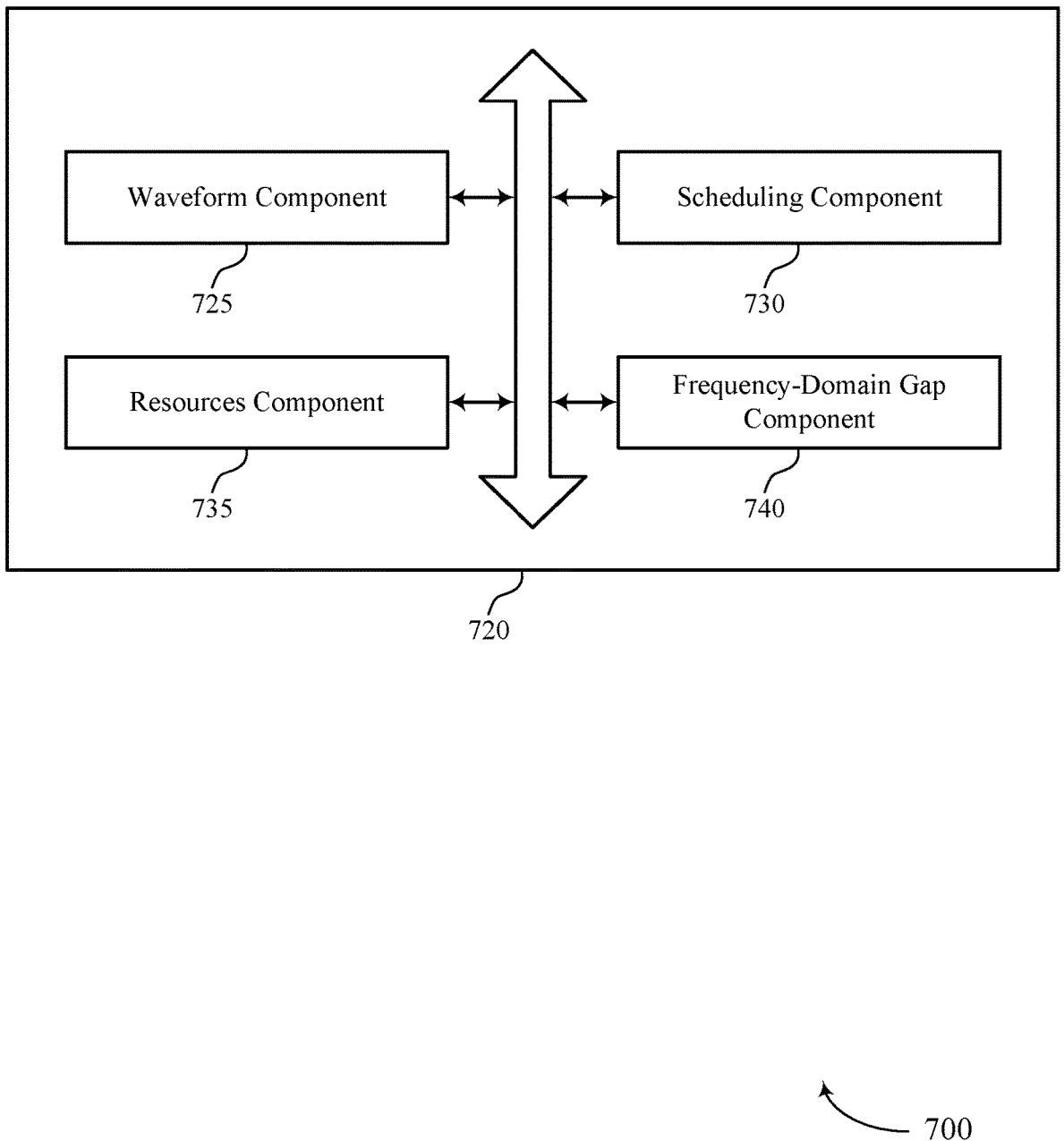
FIG. 7 shows a block diagram of a communications manager that supports resource gaps for full-duplex communications based on uplink and downlink waveforms in accordance with aspects of the present disclosure.

FIG. 7 shows a block diagram 700 of a communications manager 720 that supports resource gaps for full-duplex communications based on uplink and downlink waveforms in accordance with aspects of the present disclosure. The communications manager 720 may be an example of aspects of a communications manager 520, a communications manager 620, or both, as described herein. The communications manager 720, or various components thereof, may be an example of means for performing various aspects of resource gaps for full-duplex communications based on uplink and downlink waveforms as described herein. For example, the communications manager 720 may include a waveform component 725, a scheduling component 730, a resources component 735, a frequency-domain gap component 740, or any combination thereof. Each of these components may communicate, directly or indirectly, with one another (e.g., via one or more buses).

The communications manager 720 may support wireless communication at a UE in accordance with examples as disclosed herein. The waveform component 725 may be configured as or otherwise support a means for receiving, from a base station, a first control message indicating a configuration of a first uplink waveform to be used by the UE for full-duplex communications. The scheduling component 730 may be configured as or otherwise support a means for receiving, from the base station, a second control message scheduling a set of uplink resources and a set of downlink resources for the full-duplex communications, the set of uplink resources and the set of downlink resources at least partially overlapping in a time-domain, where a frequency-domain gap between the set of uplink resources and the set of downlink resources is based on the first uplink waveform and a first downlink waveform used by the base station. The resources component 735 may be configured as or otherwise support a means for communicating with the base station on the set of uplink resources and the set of downlink resources in accordance with the frequency-domain gap.

In some examples, the frequency-domain gap component 740 may be configured as or otherwise support a means for receiving, from the base station, a third control message indicating a configuration of a respective frequency-domain gap for each waveform pair of a set of two or more waveform pairs, each waveform pair including an uplink waveform and a downlink waveform. In some examples, the frequency-domain gap component 740 may be configured as or otherwise support a means for identifying the frequency-domain gap associated with the first uplink waveform and the first downlink waveform based on the configuration of the respective frequency-domain gap for each waveform pair.

In some examples, the frequency-domain gap component 740 may be configured as or otherwise support a means for identifying the frequency-domain gap associated with the first uplink waveform and the first downlink waveform based on a predefined configuration of a respective frequency-domain gap for each waveform pair of a set of two or more waveform pairs, each waveform pair including an uplink waveform and a downlink waveform.

In some examples, the first uplink waveform and the first downlink waveform include a same waveform type, the set of uplink resources and the set of downlink resources fully overlapping in the time-domain.

In some examples, the first uplink waveform includes a first waveform type that is different from a second waveform type of the first downlink waveform, the set of uplink resources overlapping with a portion of the set of downlink resources in the time-domain.

In some examples, to support communicating with the base station, the resources component 735 may be configured as or otherwise support a means for transmitting one or more repetitions of a physical uplink channel on the set of uplink resources that partially overlap with the set of downlink resources in the time-domain.

In some examples, the waveform component 725 may be configured as or otherwise support a means for modifying the first uplink waveform to a second uplink waveform different from the first uplink waveform based on the first uplink waveform and the first downlink waveform.

In some examples, the waveform component 725 may be configured as or otherwise support a means for receiving, from the base station, a message including an indication to modify the first uplink waveform to the second uplink waveform, where modifying the first uplink waveform to a second uplink waveform is based on the indication.

In some examples, the message is received before modifying the first uplink waveform to the second uplink waveform based on a time duration before communicating with the base station.

In some examples, the waveform component 725 may be configured as or otherwise support a means for receiving, from the base station, a fourth control message that indicates a configuration of the time duration, where the fourth control message includes a RRC message, or a medium access control (MAC)-control element, or any combination thereof.

In some examples, the time duration is based on a capability of the UE to modify the first uplink waveform to the second uplink waveform.

In some examples, the first uplink waveform is modified to the second uplink waveform based on a pathloss of a channel between the UE and the base station for the full-duplex communications satisfying a threshold value.

In some examples, the first uplink waveform is modified to the second uplink waveform based on the frequency-domain gap and a transmission power used for communicating with the base station.

In some examples, the first uplink waveform includes a single-carrier-type waveform or a cyclic-prefix (CP)-orthogonal frequency-division multiplexing (OFDM)-type waveform. In some examples, the first downlink waveform includes the single-carrier-type waveform or the CP-OFDM-type waveform.

In some examples, the single-carrier-type waveform includes a discrete Fourier transform (DFT)-spread-OFDM (DFT-s-OFDM) waveform.

Figure 8:
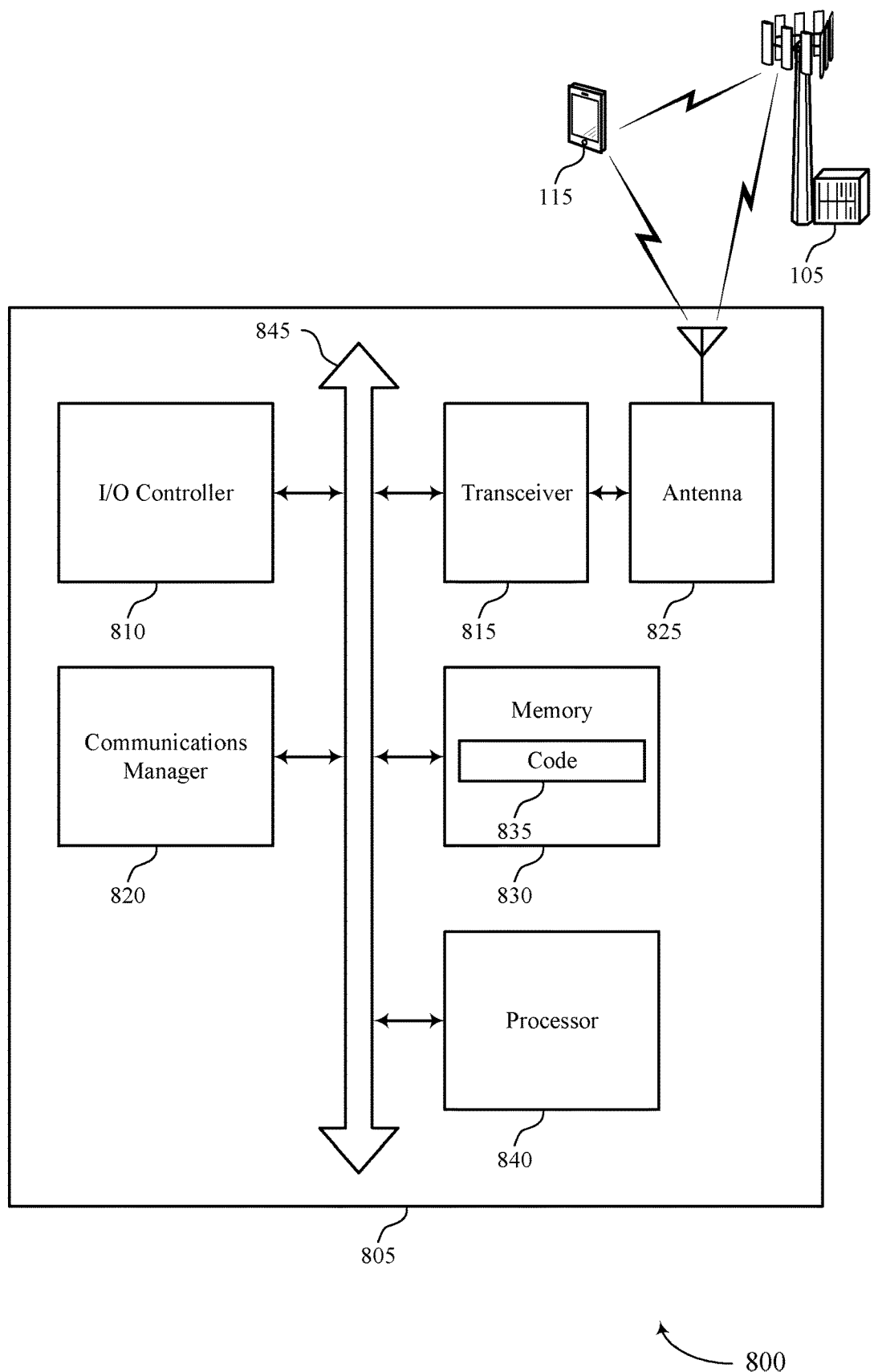
FIG. 8 shows a diagram of a system including a device that supports resource gaps for full-duplex communications based on uplink and downlink waveforms in accordance with aspects of the present disclosure.

FIG. 8 shows a diagram of a system 800 including a device 805 that supports resource gaps for full-duplex communications based on uplink and downlink waveforms in accordance with aspects of the present disclosure. The device 805 may be an example of or include the components of a device 505, a device 605, or a UE 115 as described herein. The device 805 may communicate wirelessly with one or more base stations 105, UEs 115, or any combination thereof. The device 805 may include components for bi-directional voice and data communications including components for transmitting and receiving communications, such as a communications manager 820, an input/output (I/O) controller 810, a transceiver 815, an antenna 825, a memory 830, code 835, and a processor 840. These components may be in electronic communication or otherwise coupled (e.g., operatively, communicatively, functionally, electronically, electrically) via one or more buses (e.g., a bus 845).

The I/O controller 810 may manage input and output signals for the device 805. The I/O controller 810 may also manage peripherals not integrated into the device 805. In some cases, the I/O controller 810 may represent a physical connection or port to an external peripheral. In some cases, the I/O controller 810 may utilize an operating system such as iOS®, ANDROID®, MS-DOS®, MS-WINDOWS®, OS/2®, UNIX®, LINUX®, or another known operating system. Additionally or alternatively, the I/O controller 810 may represent or interact with a modem, a keyboard, a mouse, a touchscreen, or a similar device. In some cases, the I/O controller 810 may be implemented as part of a processor, such as the processor 840. In some cases, a user may interact with the device 805 via the I/O controller 810 or via hardware components controlled by the I/O controller 810.

In some cases, the device 805 may include a single antenna 825. However, in some other cases, the device 805 may have more than one antenna 825, which may be capable of concurrently transmitting or receiving multiple wireless transmissions. The transceiver 815 may communicate bi-directionally, via the one or more antennas 825, wired, or wireless links as described herein. For example, the transceiver 815 may represent a wireless transceiver and may communicate bi-directionally with another wireless transceiver. The transceiver 815 may also include a modem to modulate the packets, to provide the modulated packets to one or more antennas 825 for transmission, and to demodulate packets received from the one or more antennas 825. The transceiver 815, or the transceiver 815 and one or more antennas 825, may be an example of a transmitter 515, a transmitter 615, a receiver 510, a receiver 610, or any combination thereof or component thereof, as described herein.

The memory 830 may include random access memory (RAM) and read-only memory (ROM). The memory 830 may store computer-readable, computer-executable code 835 including instructions that, when executed by the processor 840, cause the device 805 to perform various functions described herein. The code 835 may be stored in a non-transitory computer-readable medium such as system memory or another type of memory. In some cases, the code 835 may not be directly executable by the processor 840 but may cause a computer (e.g., when compiled and executed) to perform functions described herein. In some cases, the memory 830 may contain, among other things, a basic I/O system (BIOS) which may control basic hardware or software operation such as the interaction with peripheral components or devices.

The processor 840 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In some other cases, a memory controller may be integrated into the processor 840. The processor 840 may be configured to execute computer-readable instructions stored in a memory (e.g., the memory 830) to cause the device 805 to perform various functions (e.g., functions or tasks supporting resource gaps for full-duplex communications based on uplink and downlink waveforms). For example, the device 805 or a component of the device 805 may include a processor 840 and memory 830 coupled to the processor 840, the processor 840 and memory 830 configured to perform various functions described herein.

The communications manager 820 may support wireless communication at a UE in accordance with examples as disclosed herein. For example, the communications manager 820 may be configured as or otherwise support a means for receiving, from a base station, a first control message indicating a configuration of a first uplink waveform to be used by the UE for full-duplex communications. The communications manager 820 may be configured as or otherwise support a means for receiving, from the base station, a second control message scheduling a set of uplink resources and a set of downlink resources for the full-duplex communications, the set of uplink resources and the set of downlink resources at least partially overlapping in a time-domain, where a frequency-domain gap between the set of uplink resources and the set of downlink resources is based on the first uplink waveform and a first downlink waveform used by the base station. The communications manager 820 may be configured as or otherwise support a means for communicating with the base station on the set of uplink resources and the set of downlink resources in accordance with the frequency-domain gap.

By including or configuring the communications manager 820 in accordance with examples as described herein, the device 805 may support techniques for a base station to indicate a waveform configuration and resources to a UE for performing full-duplex communication in accordance with a frequency-domain gap related to the waveform configuration, which may cause improved communication reliability, reduced latency, improved user experience related to reduced processing, reduced power consumption, more efficient utilization of communication resources, improved coordination between devices, longer battery life, improved utilization of processing capability, and the like.

In some examples, the communications manager 820 may be configured to perform various operations (e.g., receiving, monitoring, transmitting) using or otherwise in cooperation with the transceiver 815, the one or more antennas 825, or any combination thereof. Although the communications manager 820 is illustrated as a separate component, in some examples, one or more functions described with reference to the communications manager 820 may be supported by or performed by the processor 840, the memory 830, the code 835, or any combination thereof. For example, the code 835 may include instructions executable by the processor 840 to cause the device 805 to perform various aspects of resource gaps for full-duplex communications based on uplink and downlink waveforms as described herein, or the processor 840 and the memory 830 may be otherwise configured to perform or support such operations.

Figure 9:
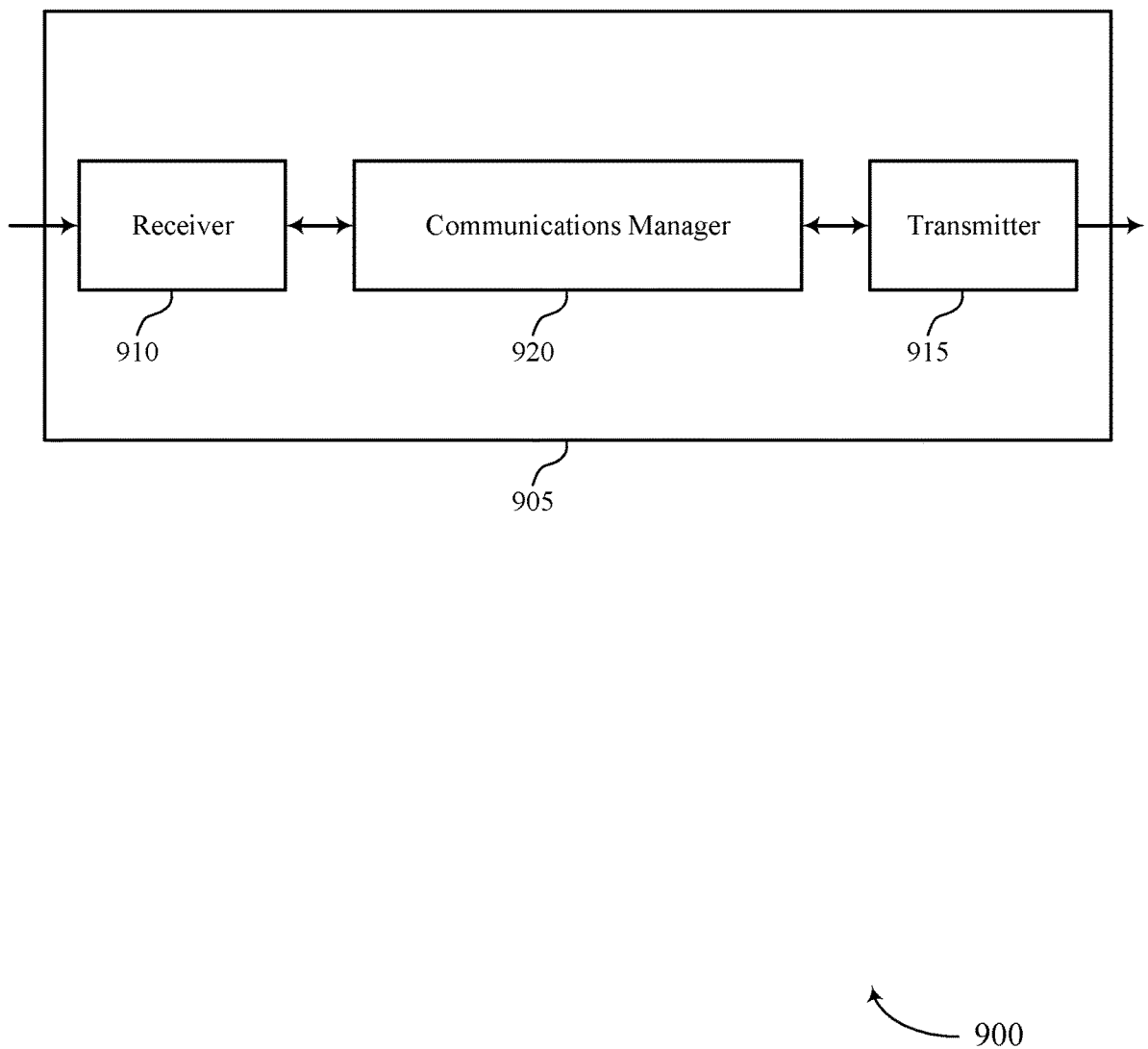
FIGS. 9 and 10 show block diagrams of devices that support resource gaps for full-duplex communications based on uplink and downlink waveforms in accordance with aspects of the present disclosure.

FIG. 9 shows a block diagram 900 of a device 905 that supports resource gaps for full-duplex communications based on uplink and downlink waveforms in accordance with aspects of the present disclosure. The device 905 may be an example of aspects of a base station 105 as described herein. The device 905 may include a receiver 910, a transmitter 915, and a communications manager 920. The device 905 may also include a processor. Each of these components may be in communication with one another (e.g., via one or more buses).

The receiver 910 may provide a means for receiving information such as packets, user data, control information, or any combination thereof associated with various information channels (e.g., control channels, data channels, information channels related to resource gaps for full-duplex communications based on uplink and downlink waveforms). Information may be passed on to other components of the device 905. The receiver 910 may utilize a single antenna or a set of multiple antennas.

The transmitter 915 may provide a means for transmitting signals generated by other components of the device 905. For example, the transmitter 915 may transmit information such as packets, user data, control information, or any combination thereof associated with various information channels (e.g., control channels, data channels, information channels related to resource gaps for full-duplex communications based on uplink and downlink waveforms). In some examples, the transmitter 915 may be co-located with a receiver 910 in a transceiver module. The transmitter 915 may utilize a single antenna or a set of multiple antennas.

The communications manager 920, the receiver 910, the transmitter 915, or various combinations thereof or various components thereof may be examples of means for performing various aspects of resource gaps for full-duplex communications based on uplink and downlink waveforms as described herein. For example, the communications manager 920, the receiver 910, the transmitter 915, or various combinations or components thereof may support a method for performing one or more of the functions described herein.

In some examples, the communications manager 920, the receiver 910, the transmitter 915, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 920, the receiver 910, the transmitter 915, or various combinations or components thereof may be implemented in code (e.g., as communications management software or firmware) executed by a processor. If implemented in code executed by a processor, the functions of the communications manager 920, the receiver 910, the transmitter 915, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 920 may be configured to perform various operations (e.g., receiving, monitoring, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to receive information, transmit information, or perform various other operations as described herein.

The communications manager 920 may support wireless communication at a base station in accordance with examples as disclosed herein. For example, the communications manager 920 may be configured as or otherwise support a means for transmitting, to a UE, a first control message indicating a configuration of a first uplink waveform to be used by the UE for full-duplex communications. The communications manager 920 may be configured as or otherwise support a means for transmitting, to the UE, a second control message scheduling a set of uplink resources and a set of downlink resources for the full-duplex communications, the set of uplink resources and the set of downlink resources at least partially overlapping in a time-domain, where a frequency-domain gap between the set of uplink resources and the set of downlink resources is based on the first uplink waveform and a first downlink waveform used by the base station. The communications manager 920 may be configured as or otherwise support a means for communicating with the UE on the set of uplink resources and the set of downlink resources in accordance with the frequency-domain gap.

By including or configuring the communications manager 920 in accordance with examples as described herein, the device 905 (e.g., a processor controlling or otherwise coupled to the receiver 910, the transmitter 915, the communications manager 920, or a combination thereof) may support techniques for a base station to indicate a waveform configuration and resources to a UE for performing full-duplex communication in accordance with a frequency-domain gap related to the waveform configuration, which may cause reduced processing, reduced power consumption, more efficient utilization of communication resources, and the like.

Figure 10:
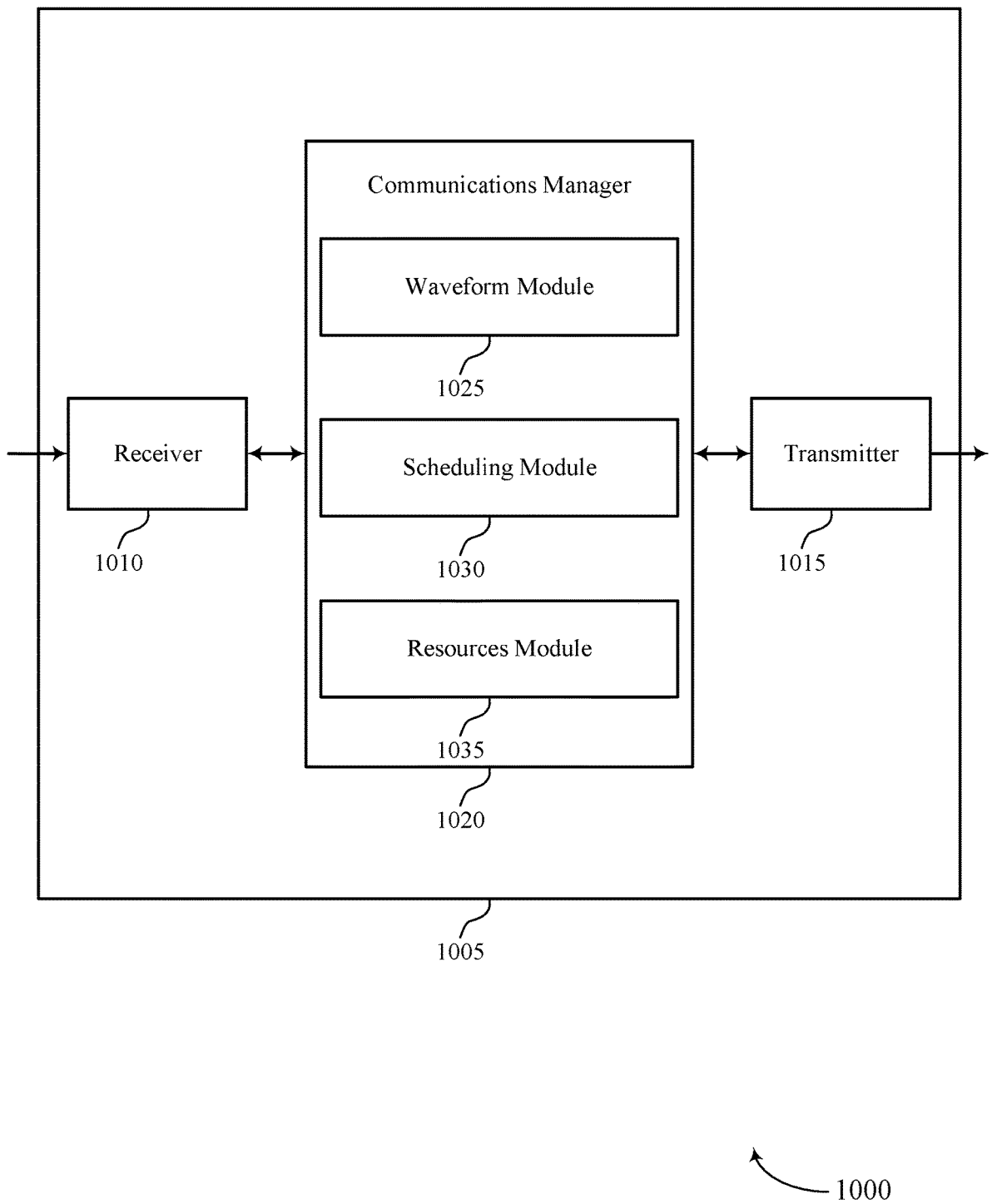

FIG. 10 shows a block diagram 1000 of a device 1005 that supports resource gaps for full-duplex communications based on uplink and downlink waveforms in accordance with aspects of the present disclosure. The device 1005 may be an example of aspects of a device 905 or a base station 105 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for receiving information such as packets, user data, control information, or any combination thereof associated with various information channels (e.g., control channels, data channels, information channels related to resource gaps for full-duplex communications based on uplink and downlink waveforms). Information may be passed on to other components of the device 1005. The receiver 1010 may utilize a single antenna or a set of multiple antennas.

The transmitter 1015 may provide a means for transmitting signals generated by other components of the device 1005. For example, the transmitter 1015 may transmit information such as packets, user data, control information, or any combination thereof associated with various information channels (e.g., control channels, data channels, information channels related to resource gaps for full-duplex communications based on uplink and downlink waveforms). In some examples, the transmitter 1015 may be co-located with a receiver 1010 in a transceiver module. The transmitter 1015 may utilize a single antenna or a set of multiple antennas.

The device 1005, or various components thereof, may be an example of means for performing various aspects of resource gaps for full-duplex communications based on uplink and downlink waveforms as described herein. For example, the communications manager 1020 may include a waveform module 1025, a scheduling module 1030, a resources module 1035, or any combination thereof. The communications manager 1020 may be an example of aspects of a communications manager 920 as described herein. In some examples, the communications manager 1020, or various components thereof, may be configured to perform various operations (e.g., receiving, monitoring, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to receive information, transmit information, or perform various other operations as described herein.

The communications manager 1020 may support wireless communication at a base station in accordance with examples as disclosed herein. The waveform module 1025 may be configured as or otherwise support a means for transmitting, to a UE, a first control message indicating a configuration of a first uplink waveform to be used by the UE for full-duplex communications. The scheduling module 1030 may be configured as or otherwise support a means for transmitting, to the UE, a second control message scheduling a set of uplink resources and a set of downlink resources for the full-duplex communications, the set of uplink resources and the set of downlink resources at least partially overlapping in a time-domain, where a frequency-domain gap between the set of uplink resources and the set of downlink resources is based on the first uplink waveform and a first downlink waveform used by the base station. The resources module 1035 may be configured as or otherwise support a means for communicating with the UE on the set of uplink resources and the set of downlink resources in accordance with the frequency-domain gap.

Figure 11:
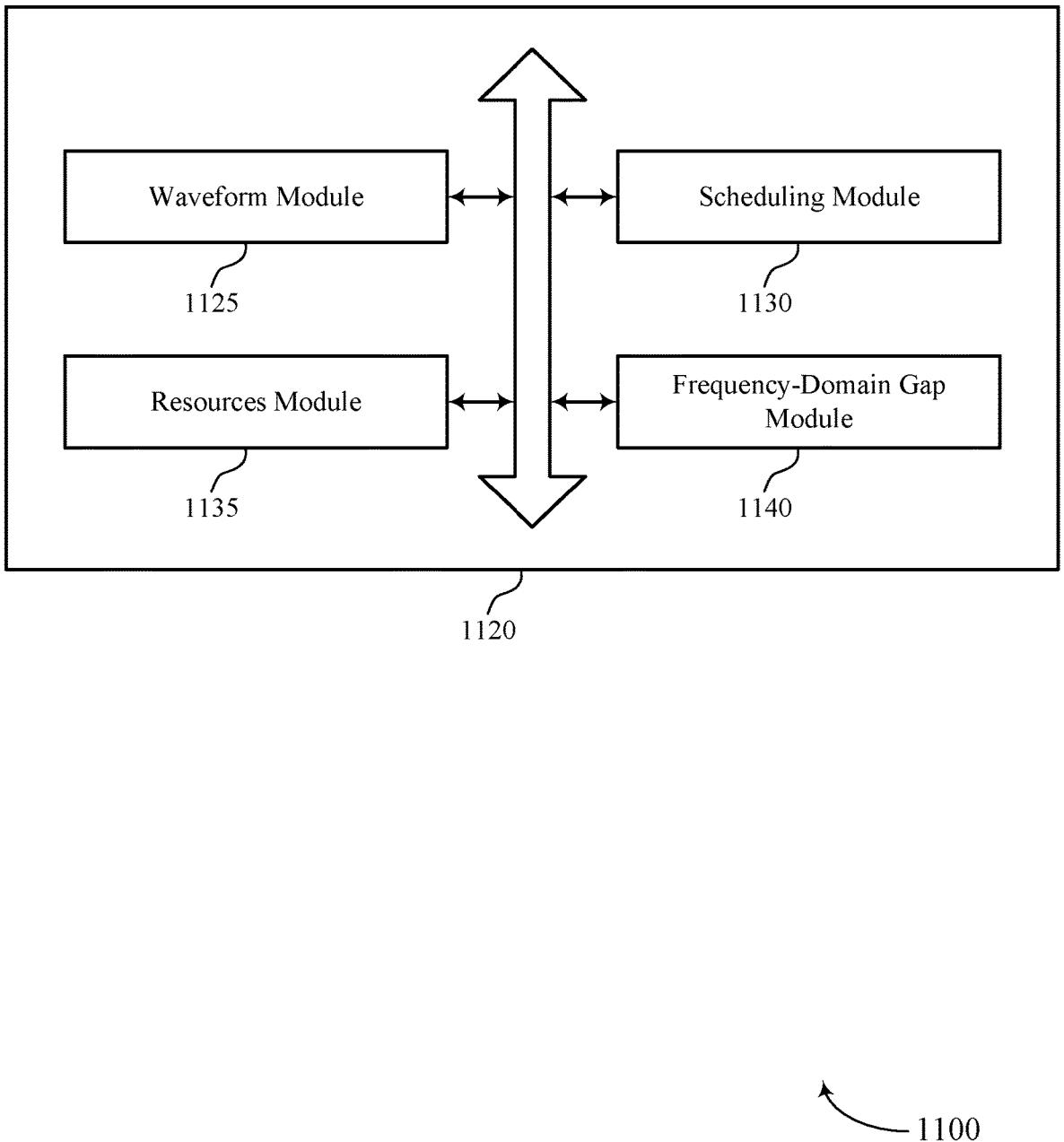
FIG. 11 shows a block diagram of a communications manager that supports resource gaps for full-duplex communications based on uplink and downlink waveforms in accordance with aspects of the present disclosure.

FIG. 11 shows a block diagram 1100 of a communications manager 1120 that supports resource gaps for full-duplex communications based on uplink and downlink waveforms in accordance with aspects of the present disclosure. The communications manager 1120 may be an example of aspects of a communications manager 920, a communications manager 1020, or both, as described herein. The communications manager 1120, or various components thereof, may be an example of means for performing various aspects of resource gaps for full-duplex communications based on uplink and downlink waveforms as described herein. For example, the communications manager 1120 may include a waveform module 1125, a scheduling module 1130, a resources module 1135, a frequency-domain gap module 1140, or any combination thereof. Each of these components may communicate, directly or indirectly, with one another (e.g., via one or more buses).

The communications manager 1120 may support wireless communication at a base station in accordance with examples as disclosed herein. The waveform module 1125 may be configured as or otherwise support a means for transmitting, to a UE, a first control message indicating a configuration of a first uplink waveform to be used by the UE for full-duplex communications. The scheduling module 1130 may be configured as or otherwise support a means for transmitting, to the UE, a second control message scheduling a set of uplink resources and a set of downlink resources for the full-duplex communications, the set of uplink resources and the set of downlink resources at least partially overlapping in a time-domain, where a frequency-domain gap between the set of uplink resources and the set of downlink resources is based on the first uplink waveform and a first downlink waveform used by the base station. The resources module 1135 may be configured as or otherwise support a means for communicating with the UE on the set of uplink resources and the set of downlink resources in accordance with the frequency-domain gap.

In some examples, the frequency-domain gap module 1140 may be configured as or otherwise support a means for transmitting, to the UE, a third control message indicating a configuration of a respective frequency-domain gap for each waveform pair of a set of two or more waveform pairs, each waveform pair including an uplink waveform and a downlink waveform, where the frequency-domain gap associated with the first uplink waveform and the first downlink waveform is based on the configuration of the respective frequency-domain gap for each waveform pair.

In some examples, the first uplink waveform and the first downlink waveform include a same waveform type, the set of uplink resources and the set of downlink resources fully overlapping in the time-domain.

In some examples, the first uplink waveform includes a first waveform type that is different from a second waveform type of the first downlink waveform, the set of uplink resources overlapping with a portion of the set of downlink resources in the time-domain.

In some examples, to support communicating with the UE, the resources module 1135 may be configured as or otherwise support a means for receiving one or more repetitions of a physical uplink channel on the set of uplink resources that partially overlap with the set of downlink resources in the time-domain.

In some examples, the waveform module 1125 may be configured as or otherwise support a means for modifying the first downlink waveform to a second downlink waveform different from the first downlink waveform based on the first uplink waveform and the first downlink waveform.

In some examples, the waveform module 1125 may be configured as or otherwise support a means for measuring a pathloss for a channel between the base station and the UE associated with the full-duplex communications. In some examples, the waveform module 1125 may be configured as or otherwise support a means for determining that the pathloss satisfies a threshold value, where modifying the first downlink waveform to a second downlink waveform is based on the pathloss satisfying the threshold value.

In some examples, the first downlink waveform is modified to the second downlink waveform based on a power headroom report of the UE.

In some examples, the waveform module 1125 may be configured as or otherwise support a means for transmitting, to the UE, a message including an indication to modify the first uplink waveform to a second uplink waveform different from the first uplink waveform based on the first uplink waveform and the first downlink waveform being different waveform types, the second uplink waveform including a same waveform type as the first downlink waveform.

In some examples, the message is transmitted before the first uplink waveform is modified to the second uplink waveform based on a time duration before communicating with the UE, and the waveform module 1125 may be configured as or otherwise support a means for transmitting, to the UE, a fourth control message that indicates a configuration of the time duration, where the fourth control message includes a RRC message, or a medium access control (MAC)-control element, or any combination thereof.

Figure 12:
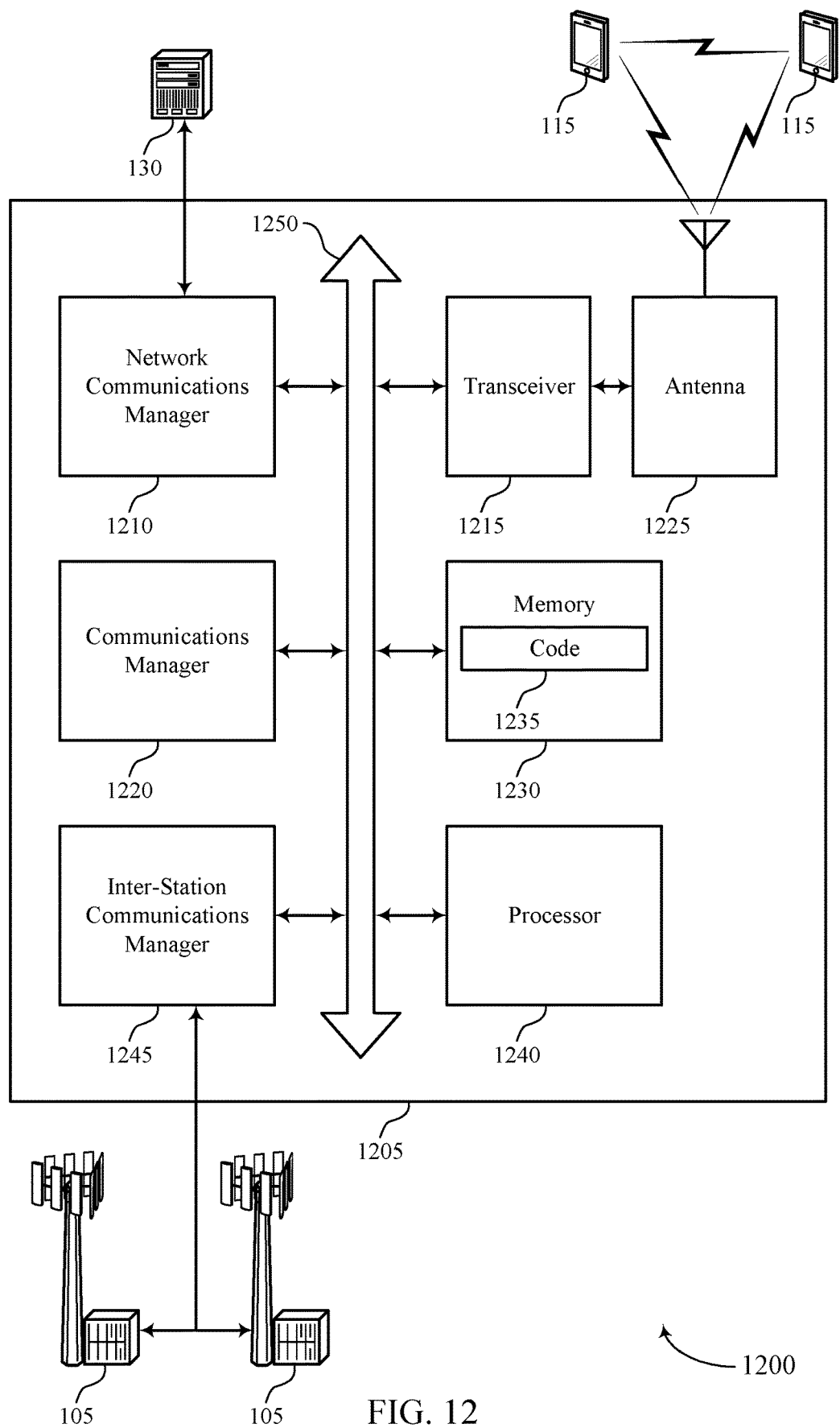
FIG. 12 shows a diagram of a system including a device that supports resource gaps for full-duplex communications based on uplink and downlink waveforms in accordance with aspects of the present disclosure.

FIG. 12 shows a diagram of a system 1200 including a device 1205 that supports resource gaps for full-duplex communications based on uplink and downlink waveforms in accordance with aspects of the present disclosure. The device 1205 may be an example of or include the components of a device 905, a device 1005, or a base station 105 as described herein. The device 1205 may communicate wirelessly with one or more base stations 105, UEs 115, or any combination thereof. The device 1205 may include components for bi-directional voice and data communications including components for transmitting and receiving communications, such as a communications manager 1220, a network communications manager 1210, a transceiver 1215, an antenna 1225, a memory 1230, code 1235, a processor 1240, and an inter-station communications manager 1245. These components may be in electronic communication or otherwise coupled (e.g., operatively, communicatively, functionally, electronically, electrically) via one or more buses (e.g., a bus 1250).

The network communications manager 1210 may manage communications with a core network 130 (e.g., via one or more wired backhaul links). For example, the network communications manager 1210 may manage the transfer of data communications for client devices, such as one or more UEs 115.

In some cases, the device 1205 may include a single antenna 1225. However, in some other cases the device 1205 may have more than one antenna 1225, which may be capable of concurrently transmitting or receiving multiple wireless transmissions. The transceiver 1215 may communicate bi-directionally, via the one or more antennas 1225, wired, or wireless links as described herein. For example, the transceiver 1215 may represent a wireless transceiver and may communicate bi-directionally with another wireless transceiver. The transceiver 1215 may also include a modem to modulate the packets, to provide the modulated packets to one or more antennas 1225 for transmission, and to demodulate packets received from the one or more antennas 1225. The transceiver 1215, or the transceiver 1215 and one or more antennas 1225, may be an example of a transmitter 915, a transmitter 1015, a receiver 910, a receiver 1010, or any combination thereof or component thereof, as described herein.

The memory 1230 may include RAM and ROM. The memory 1230 may store computer-readable, computer-executable code 1235 including instructions that, when executed by the processor 1240, cause the device 1205 to perform various functions described herein. The code 1235 may be stored in a non-transitory computer-readable medium such as system memory or another type of memory. In some cases, the code 1235 may not be directly executable by the processor 1240 but may cause a computer (e.g., when compiled and executed) to perform functions described herein. In some cases, the memory 1230 may contain, among other things, a BIOS which may control basic hardware or software operation such as the interaction with peripheral components or devices.

The processor 1240 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In some other cases, a memory controller may be integrated into the processor 1240. The processor 1240 may be configured to execute computer-readable instructions stored in a memory (e.g., the memory 1230) to cause the device 1205 to perform various functions (e.g., functions or tasks supporting resource gaps for full-duplex communications based on uplink and downlink waveforms). For example, the device 1205 or a component of the device 1205 may include a processor 1240 and memory 1230 coupled to the processor 1240, the processor 1240 and memory 1230 configured to perform various functions described herein.

The inter-station communications manager 1245 may manage communications with other base stations 105, and may include a controller or scheduler for controlling communications with UEs 115 in cooperation with other base stations 105. For example, the inter-station communications manager 1245 may coordinate scheduling for transmissions to UEs 115 for various interference mitigation techniques such as beamforming or joint transmission. In some examples, the inter-station communications manager 1245 may provide an X2 interface within an LTE/LTE-A wireless communications network technology to provide communication between base stations 105.

The communications manager 1220 may support wireless communication at a base station in accordance with examples as disclosed herein. For example, the communications manager 1220 may be configured as or otherwise support a means for transmitting, to a UE, a first control message indicating a configuration of a first uplink waveform to be used by the UE for full-duplex communications. The communications manager 1220 may be configured as or otherwise support a means for transmitting, to the UE, a second control message scheduling a set of uplink resources and a set of downlink resources for the full-duplex communications, the set of uplink resources and the set of downlink resources at least partially overlapping in a time-domain, where a frequency-domain gap between the set of uplink resources and the set of downlink resources is based on the first uplink waveform and a first downlink waveform used by the base station. The communications manager 1220 may be configured as or otherwise support a means for communicating with the UE on the set of uplink resources and the set of downlink resources in accordance with the frequency-domain gap.

By including or configuring the communications manager 1220 in accordance with examples as described herein, the device 1205 may support techniques for a base station to indicate a waveform configuration and resources to a UE for performing full-duplex communication in accordance with a frequency-domain gap related to the waveform configuration, which may cause improved communication reliability, reduced latency, improved user experience related to reduced processing, reduced power consumption, more efficient utilization of communication resources, improved coordination between devices, longer battery life, improved utilization of processing capability, and the like.

In some examples, the communications manager 1220 may be configured to perform various operations (e.g., receiving, monitoring, transmitting) using or otherwise in cooperation with the transceiver 1215, the one or more antennas 1225, or any combination thereof. Although the communications manager 1220 is illustrated as a separate component, in some examples, one or more functions described with reference to the communications manager 1220 may be supported by or performed by the processor 1240, the memory 1230, the code 1235, or any combination thereof. For example, the code 1235 may include instructions executable by the processor 1240 to cause the device 1205 to perform various aspects of resource gaps for full-duplex communications based on uplink and downlink waveforms as described herein, or the processor 1240 and the memory 1230 may be otherwise configured to perform or support such operations.

Figure 13:
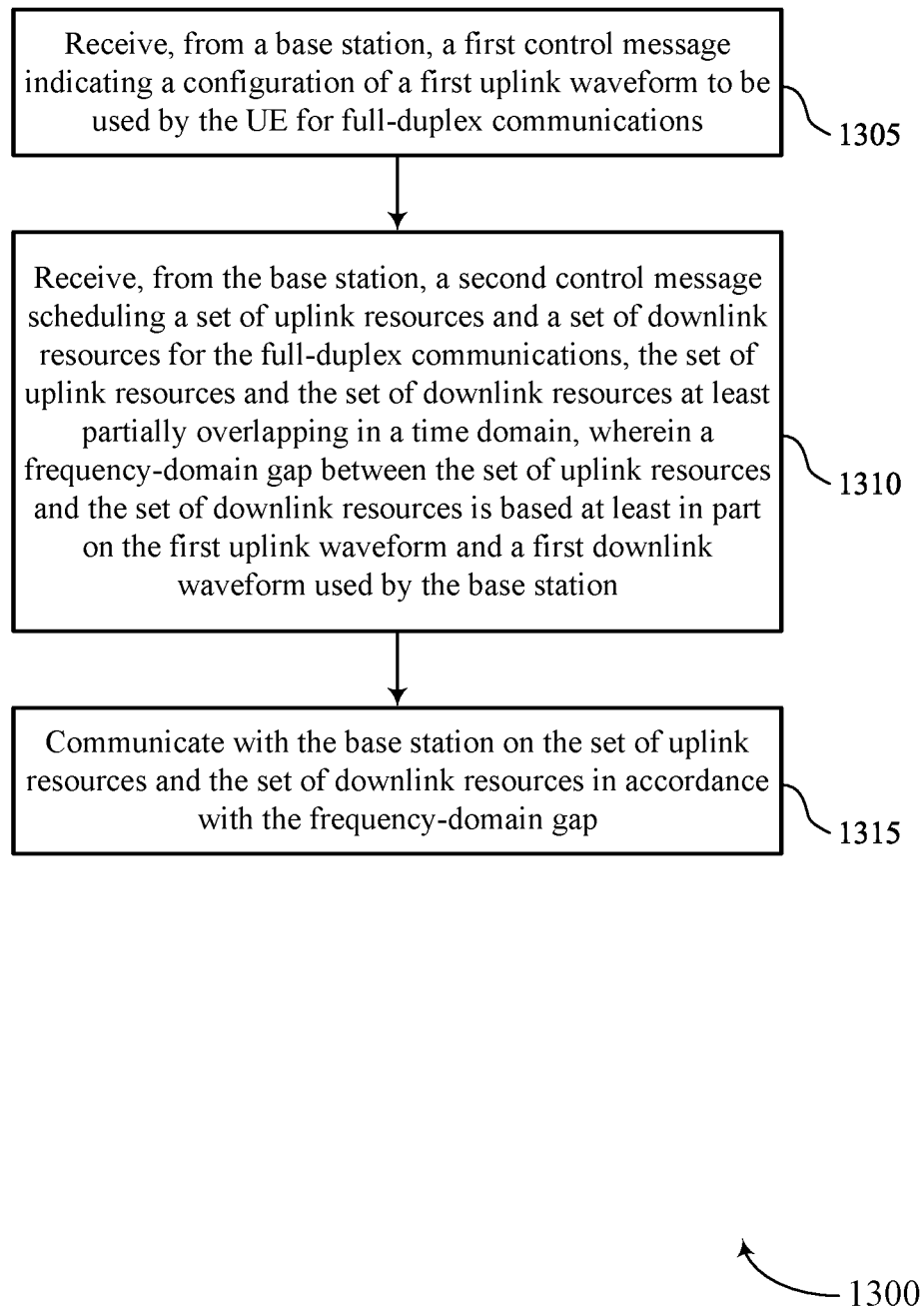
FIGS. 13 through 17 show flowcharts illustrating methods that support resource gaps for full-duplex communications based on uplink and downlink waveforms in accordance with aspects of the present disclosure.

FIG. 13 shows a flowchart illustrating a method 1300 that supports resource gaps for full-duplex communications based on uplink and downlink waveforms in accordance with aspects of the present disclosure. The operations of the method 1300 may be implemented by a UE or its components as described herein. For example, the operations of the method 1300 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1305, the method may include receiving, from a base station, a first control message indicating a configuration of a first uplink waveform to be used by the UE for full-duplex communications. The operations of 1305 may be performed in accordance with examples as disclosed herein. In some examples, aspects of the operations of 1305 may be performed by a waveform component 725 as described with reference to FIG. 7.

At 1310, the method may include receiving, from the base station, a second control message scheduling a set of uplink resources and a set of downlink resources for the full-duplex communications, the set of uplink resources and the set of downlink resources at least partially overlapping in a time-domain, where a frequency-domain gap between the set of uplink resources and the set of downlink resources is based on the first uplink waveform and a first downlink waveform used by the base station. The operations of 1310 may be performed in accordance with examples as disclosed herein. In some examples, aspects of the operations of 1310 may be performed by a scheduling component 730 as described with reference to FIG. 7.

At 1315, the method may include communicating with the base station on the set of uplink resources and the set of downlink resources in accordance with the frequency-domain gap. The operations of 1315 may be performed in accordance with examples as disclosed herein. In some examples, aspects of the operations of 1315 may be performed by a resources component 735 as described with reference to FIG. 7.

Figure 14:
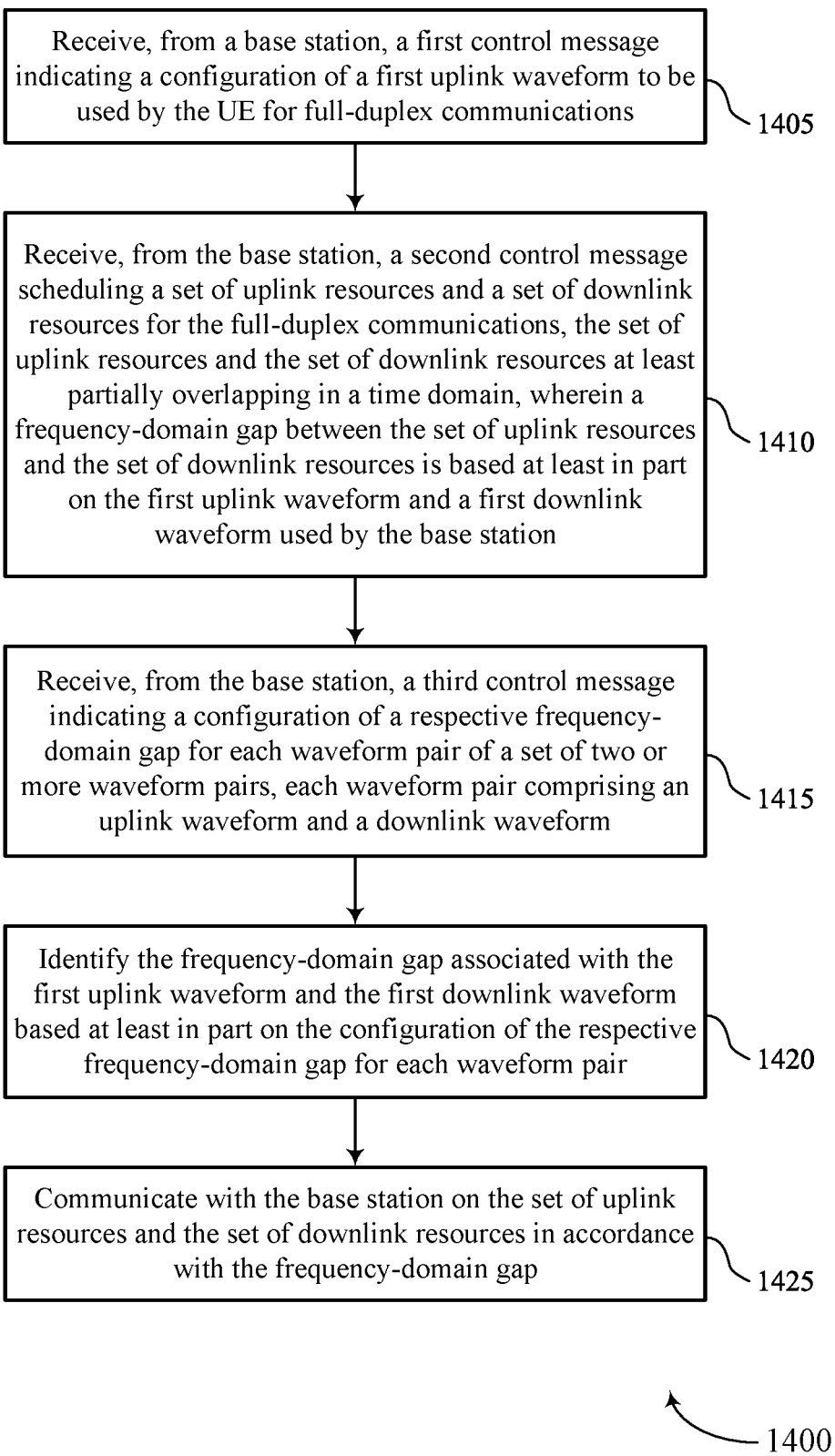

FIG. 14 shows a flowchart illustrating a method 1400 that supports resource gaps for full-duplex communications based on uplink and downlink waveforms in accordance with aspects of the present disclosure. The operations of the method 1400 may be implemented by a UE or its components as described herein. For example, the operations of the method 1400 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1405, the method may include receiving, from a base station, a first control message indicating a configuration of a first uplink waveform to be used by the UE for full-duplex communications. The operations of 1405 may be performed in accordance with examples as disclosed herein. In some examples, aspects of the operations of 1405 may be performed by a waveform component 725 as described with reference to FIG. 7.

At 1410, the method may include receiving, from the base station, a second control message scheduling a set of uplink resources and a set of downlink resources for the full-duplex communications, the set of uplink resources and the set of downlink resources at least partially overlapping in a time-domain, where a frequency-domain gap between the set of uplink resources and the set of downlink resources is based on the first uplink waveform and a first downlink waveform used by the base station. The operations of 1410 may be performed in accordance with examples as disclosed herein. In some examples, aspects of the operations of 1410 may be performed by a scheduling component 730 as described with reference to FIG. 7.

At 1415, the method may include receiving, from the base station, a third control message indicating a configuration of a respective frequency-domain gap for each waveform pair of a set of two or more waveform pairs, each waveform pair including an uplink waveform and a downlink waveform. The operations of 1415 may be performed in accordance with examples as disclosed herein. In some examples, aspects of the operations of 1415 may be performed by a frequency-domain gap component 740 as described with reference to FIG. 7.

At 1420, the method may include identifying the frequency-domain gap associated with the first uplink waveform and the first downlink waveform based on the configuration of the respective frequency-domain gap for each waveform pair. The operations of 1420 may be performed in accordance with examples as disclosed herein. In some examples, aspects of the operations of 1420 may be performed by a frequency-domain gap component 740 as described with reference to FIG. 7.

At 1425, the method may include communicating with the base station on the set of uplink resources and the set of downlink resources in accordance with the frequency-domain gap. The operations of 1425 may be performed in accordance with examples as disclosed herein. In some examples, aspects of the operations of 1425 may be performed by a resources component 735 as described with reference to FIG. 7.

Figure 15:
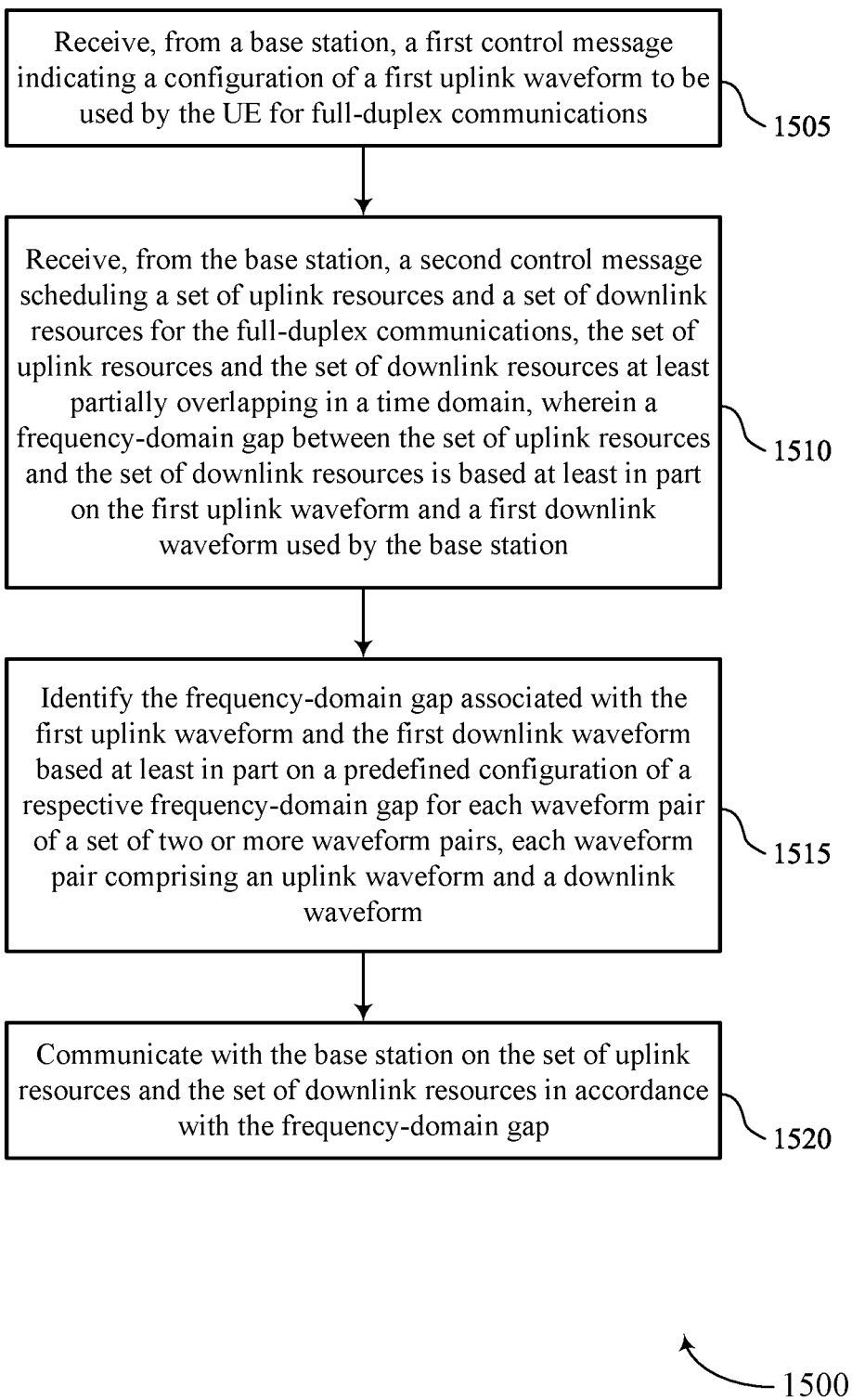

FIG. 15 shows a flowchart illustrating a method 1500 that supports resource gaps for full-duplex communications based on uplink and downlink waveforms in accordance with aspects of the present disclosure. The operations of the method 1500 may be implemented by a UE or its components as described herein. For example, the operations of the method 1500 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1505, the method may include receiving, from a base station, a first control message indicating a configuration of a first uplink waveform to be used by the UE for full-duplex communications. The operations of 1505 may be performed in accordance with examples as disclosed herein. In some examples, aspects of the operations of 1505 may be performed by a waveform component 725 as described with reference to FIG. 7.

At 1510, the method may include receiving, from the base station, a second control message scheduling a set of uplink resources and a set of downlink resources for the full-duplex communications, the set of uplink resources and the set of downlink resources at least partially overlapping in a time-domain, where a frequency-domain gap between the set of uplink resources and the set of downlink resources is based on the first uplink waveform and a first downlink waveform used by the base station. The operations of 1510 may be performed in accordance with examples as disclosed herein. In some examples, aspects of the operations of 1510 may be performed by a scheduling component 730 as described with reference to FIG. 7.

At 1515, the method may include identifying the frequency-domain gap associated with the first uplink waveform and the first downlink waveform based on a predefined configuration of a respective frequency-domain gap for each waveform pair of a set of two or more waveform pairs, each waveform pair including an uplink waveform and a downlink waveform. The operations of 1515 may be performed in accordance with examples as disclosed herein. In some examples, aspects of the operations of 1515 may be performed by a frequency-domain gap component 740 as described with reference to FIG. 7.

At 1520, the method may include communicating with the base station on the set of uplink resources and the set of downlink resources in accordance with the frequency-domain gap. The operations of 1520 may be performed in accordance with examples as disclosed herein. In some examples, aspects of the operations of 1520 may be performed by a resources component 735 as described with reference to FIG. 7.

Figure 16:
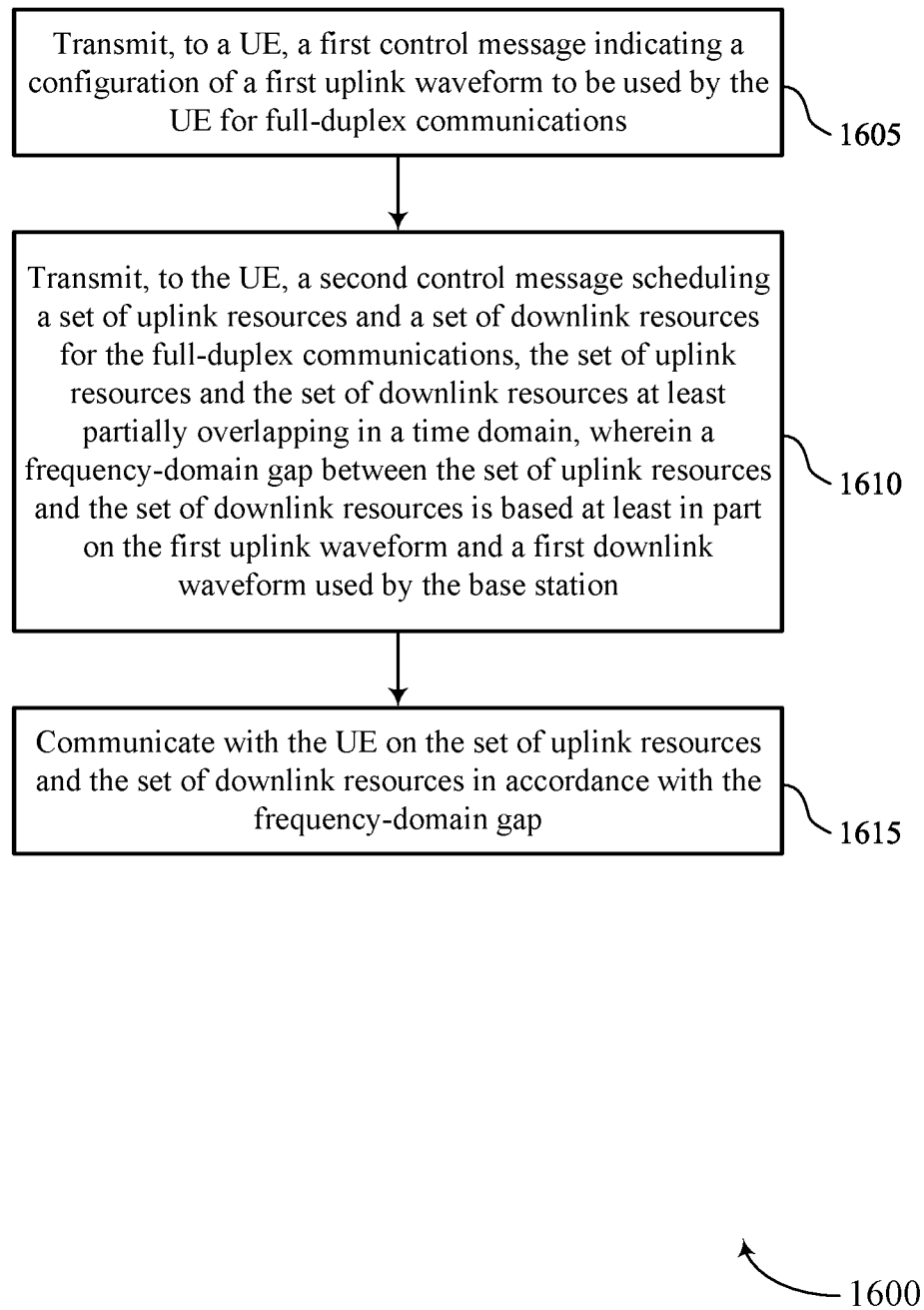

FIG. 16 shows a flowchart illustrating a method 1600 that supports resource gaps for full-duplex communications based on uplink and downlink waveforms in accordance with aspects of the present disclosure. The operations of the method 1600 may be implemented by a base station or its components as described herein. For example, the operations of the method 1600 may be performed by a base station 105 as described with reference to FIGS. 1 through 4 and 9 through 12. In some examples, a base station may execute a set of instructions to control the functional elements of the base station to perform the described functions. Additionally or alternatively, the base station may perform aspects of the described functions using special-purpose hardware.

At 1605, the method may include transmitting, to a UE, a first control message indicating a configuration of a first uplink waveform to be used by the UE for full-duplex communications. The operations of 1605 may be performed in accordance with examples as disclosed herein. In some examples, aspects of the operations of 1605 may be performed by a waveform module 1125 as described with reference to FIG. 11.

At 1610, the method may include transmitting, to the UE, a second control message scheduling a set of uplink resources and a set of downlink resources for the full-duplex communications, the set of uplink resources and the set of downlink resources at least partially overlapping in a time-domain, where a frequency-domain gap between the set of uplink resources and the set of downlink resources is based on the first uplink waveform and a first downlink waveform used by the base station. The operations of 1610 may be performed in accordance with examples as disclosed herein. In some examples, aspects of the operations of 1610 may be performed by a scheduling module 1130 as described with reference to FIG. 11.

At 1615, the method may include communicating with the UE on the set of uplink resources and the set of downlink resources in accordance with the frequency-domain gap. The operations of 1615 may be performed in accordance with examples as disclosed herein. In some examples, aspects of the operations of 1615 may be performed by a resources module 1135 as described with reference to FIG. 11.

Figure 17:
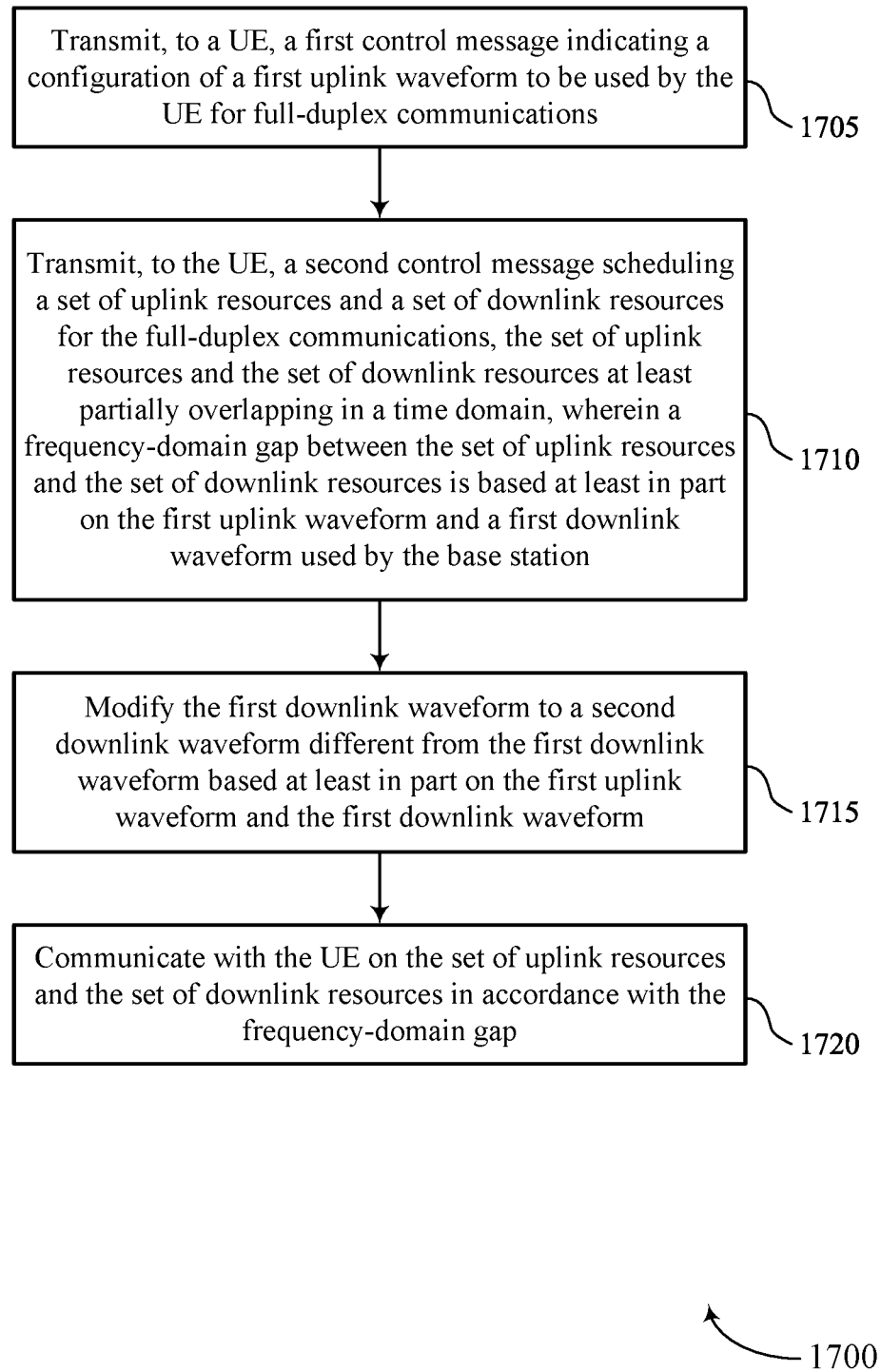

FIG. 17 shows a flowchart illustrating a method 1700 that supports resource gaps for full-duplex communications based on uplink and downlink waveforms in accordance with aspects of the present disclosure. The operations of the method 1700 may be implemented by a base station or its components as described herein. For example, the operations of the method 1700 may be performed by a base station 105 as described with reference to FIGS. 1 through 4 and 9 through 12. In some examples, a base station may execute a set of instructions to control the functional elements of the base station to perform the described functions. Additionally or alternatively, the base station may perform aspects of the described functions using special-purpose hardware.

At 1705, the method may include transmitting, to a UE, a first control message indicating a configuration of a first uplink waveform to be used by the UE for full-duplex communications. The operations of 1705 may be performed in accordance with examples as disclosed herein. In some examples, aspects of the operations of 1705 may be performed by a waveform module 1125 as described with reference to FIG. 11.

At 1710, the method may include transmitting, to the UE, a second control message scheduling a set of uplink resources and a set of downlink resources for the full-duplex communications, the set of uplink resources and the set of downlink resources at least partially overlapping in a time-domain, where a frequency-domain gap between the set of uplink resources and the set of downlink resources is based on the first uplink waveform and a first downlink waveform used by the base station. The operations of 1710 may be performed in accordance with examples as disclosed herein. In some examples, aspects of the operations of 1710 may be performed by a scheduling module 1130 as described with reference to FIG. 11.

At 1715, the method may include modifying the first downlink waveform to a second downlink waveform different from the first downlink waveform based on the first uplink waveform and the first downlink waveform. The operations of 1715 may be performed in accordance with examples as disclosed herein. In some examples, aspects of the operations of 1715 may be performed by a waveform module 1125 as described with reference to FIG. 11.

At 1720, the method may include communicating with the UE on the set of uplink resources and the set of downlink resources in accordance with the frequency-domain gap. The operations of 1720 may be performed in accordance with examples as disclosed herein. In some examples, aspects of the operations of 1720 may be performed by a resources module 1135 as described with reference to FIG. 11.

The following provides an overview of aspects of the present disclosure:

Aspect 1: A method for wireless communication at a UE, comprising: receiving, from a base station, a first control message indicating a configuration of a first uplink waveform to be used by the UE for full-duplex communications; receiving, from the base station, a second control message scheduling a set of uplink resources and a set of downlink resources for the full-duplex communications, the set of uplink resources and the set of downlink resources at least partially overlapping in a time domain, wherein a frequency-domain gap between the set of uplink resources and the set of downlink resources is based at least in part on the first uplink waveform and a first downlink waveform used by the base station; and communicating with the base station on the set of uplink resources and the set of downlink resources in accordance with the frequency-domain gap.

Aspect 2: The method of aspect 1, further comprising: receiving, from the base station, a third control message indicating a configuration of a respective frequency-domain gap for each waveform pair of a set of two or more waveform pairs, each waveform pair comprising an uplink waveform and a downlink waveform; and identifying the frequency-domain gap associated with the first uplink waveform and the first downlink waveform based at least in part on the configuration of the respective frequency-domain gap for each waveform pair.

Aspect 3: The method of aspect 1, further comprising: identifying the frequency-domain gap associated with the first uplink waveform and the first downlink waveform based at least in part on a predefined configuration of a respective frequency-domain gap for each waveform pair of a set of two or more waveform pairs, each waveform pair comprising an uplink waveform and a downlink waveform.

Aspect 4: The method of any of aspects 1 through 3, wherein the first uplink waveform and the first downlink waveform comprise a same waveform type, the set of uplink resources and the set of downlink resources fully overlapping in the time domain.

Aspect 5: The method of any of aspects 1 through 3, wherein the first uplink waveform comprises a first waveform type that is different from a second waveform type of the first downlink waveform, the set of uplink resources overlapping with a portion of the set of downlink resources in the time domain.

Aspect 6: The method of aspect 5, wherein communicating with the base station comprises: transmitting one or more repetitions of a physical uplink channel on the set of uplink resources that partially overlap with the set of downlink resources in the time domain.

Aspect 7: The method of any of aspects 1 through 6, further comprising: modifying the first uplink waveform to a second uplink waveform different from the first uplink waveform based at least in part on the first uplink waveform and the first downlink waveform.

Aspect 8: The method of aspect 7, further comprising: receiving, from the base station, a message comprising an indication to modify the first uplink waveform to the second uplink waveform, wherein modifying the first uplink waveform to a second uplink waveform is based at least in part on the indication.

Aspect 9: The method of aspect 8, wherein the message is received before modifying the first uplink waveform to the second uplink waveform based at least in part on a time duration before communicating with the base station.

Aspect 10: The method of aspect 9, further comprising: receiving, from the base station, a fourth control message that indicates a configuration of the time duration, wherein the fourth control message comprises a radio resource control message, or a medium access control (MAC)-control element, or any combination thereof.

Aspect 11: The method of any of aspects 9 through 10, wherein the time duration is based at least in part on a capability of the UE to modify the first uplink waveform to the second uplink waveform.

Aspect 12: The method of any of aspects 7 through 11, wherein the first uplink waveform is modified to the second uplink waveform based at least in part on a pathloss of a channel between the UE and the base station for the full-duplex communications satisfying a threshold value.

Aspect 13: The method of any of aspects 7 through 12, wherein the first uplink waveform is modified to the second uplink waveform based at least in part on the frequency-domain gap and a transmission power used for communicating with the base station.

Aspect 14: The method of any of aspects 1 through 13, wherein the first uplink waveform comprises a single-carrier-type waveform or a cyclic-prefix (CP)-orthogonal frequency-division multiplexing (OFDM)-type waveform; and the first downlink waveform comprises the single-carrier-type waveform or the CP-OFDM-type waveform.

Aspect 15: The method of aspect 14, wherein the single-carrier-type waveform comprises a discrete Fourier transform (DFT)-spread-OFDM (DFT-s-OFDM) waveform.

Aspect 16: A method for wireless communication at a base station, comprising: transmitting, to a UE, a first control message indicating a configuration of a first uplink waveform to be used by the UE for full-duplex communications; transmitting, to the UE, a second control message scheduling a set of uplink resources and a set of downlink resources for the full-duplex communications, the set of uplink resources and the set of downlink resources at least partially overlapping in a time domain, wherein a frequency-domain gap between the set of uplink resources and the set of downlink resources is based at least in part on the first uplink waveform and a first downlink waveform used by the base station; and communicating with the UE on the set of uplink resources and the set of downlink resources in accordance with the frequency-domain gap.

Aspect 17: The method of aspect 16, further comprising: transmitting, to the UE, a third control message indicating a configuration of a respective frequency-domain gap for each waveform pair of a set of two or more waveform pairs, each waveform pair comprising an uplink waveform and a downlink waveform, wherein the frequency-domain gap associated with the first uplink waveform and the first downlink waveform is based at least in part on the configuration of the respective frequency-domain gap for each waveform pair.

Aspect 18: The method of any of aspects 16 through 17, wherein the first uplink waveform and the first downlink waveform comprise a same waveform type, the set of uplink resources and the set of downlink resources fully overlapping in the time domain.

Aspect 19: The method of any of aspects 16 through 17, wherein the first uplink waveform comprises a first waveform type that is different from a second waveform type of the first downlink waveform, the set of uplink resources overlapping with a portion of the set of downlink resources in the time domain.

Aspect 20: The method of aspect 19, wherein communicating with the UE comprises: receiving one or more repetitions of a physical uplink channel on the set of uplink resources that partially overlap with the set of downlink resources in the time domain.

Aspect 21: The method of any of aspects 16 through 20, further comprising: modifying the first downlink waveform to a second downlink waveform different from the first downlink waveform based at least in part on the first uplink waveform and the first downlink waveform.

Aspect 22: The method of aspect 21, further comprising: measuring a pathloss for a channel between the base station and the UE associated with the full-duplex communications; determining that the pathloss satisfies a threshold value, wherein modifying the first downlink waveform to a second downlink waveform is based at least in part on the pathloss satisfying the threshold value.

Aspect 23: The method of any of aspects 21 through 22, wherein the first downlink waveform is modified to the second downlink waveform based at least in part on a power headroom report of the UE.

Aspect 24: The method of any of aspects 16 through 23, further comprising: transmitting, to the UE, a message comprising an indication to modify the first uplink waveform to a second uplink waveform different from the first uplink waveform based at least in part on the first uplink waveform and the first downlink waveform being different waveform types, the second uplink waveform comprising a same waveform type as the first downlink waveform.

Aspect 25: The method of aspect 24, wherein the message is transmitted before the first uplink waveform is modified to the second uplink waveform based at least in part on a time duration before communicating with the UE, the method further comprising: transmitting, to the UE, a fourth control message that indicates a configuration of the time duration, wherein the fourth control message comprises a radio resource control message, or a medium access control (MAC)-control element, or any combination thereof.

Aspect 26: An apparatus for wireless communication at a UE, comprising a memory, a processor coupled to the memory and configured to perform a method of any of aspects 1 through 15.

Aspect 27: An apparatus for wireless communication at a UE, comprising at least one means for performing a method of any of aspects 1 through 15.

Aspect 28: A non-transitory computer-readable medium storing code for wireless communication at a UE, the code comprising instructions executable by a processor to perform a method of any of aspects 1 through 15.

Aspect 29: An apparatus for wireless communication at a base station, comprising a processor; memory coupled with the processor; and instructions stored in the memory and executable by the processor to cause the apparatus to perform a method of any of aspects 16 through 25.

Aspect 30: An apparatus for wireless communication at a base station, comprising at least one means for performing a method of any of aspects 16 through 25.

Aspect 31: A non-transitory computer-readable medium storing code for wireless communication at a base station, the code comprising instructions executable by a processor to perform a method of any of aspects 16 through 25.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD)ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus for wireless communication at a user equipment (UE), comprising:
    one or more memories; and
    one or more processors coupled with the one or more memories and configured to:
        receive, from a network device, a first control message indicating a configuration of a first uplink waveform to be used by the UE for full-duplex communications;
        receive, from the network device, a second control message scheduling a set of uplink resources and a set of downlink resources for the full-duplex communications, the set of uplink resources and the set of downlink resources at least partially overlapping in a time-domain, wherein a frequency-domain gap between the set of uplink resources and the set of downlink resources is based at least in part on a waveform pair of a set of two or more waveform pairs, wherein the waveform pair comprises the first uplink waveform and a first downlink waveform used by the network device; and
        communicate with the network device on the set of uplink resources and the set of downlink resources in accordance with the frequency-domain gap.

2. The apparatus of claim 1, wherein the one or more processors are further configured to:
    receive, from the network device, a third control message indicating a configuration of a respective frequency-domain gap for each waveform pair of the set of two or more waveform pairs, each waveform pair comprising an uplink waveform and a downlink waveform; and
    identify the frequency-domain gap for the waveform pair associated with the first uplink waveform and the first downlink waveform based at least in part on the configuration of the respective frequency-domain gap for each waveform pair.

3. The apparatus of claim 1, wherein the one or more processors are further configured to:
    identify the frequency-domain gap for the waveform pair associated with the first uplink waveform and the first downlink waveform based at least in part on a predefined configuration of a respective frequency-domain gap for each waveform pair of the set of two or more waveform pairs, each waveform pair comprising an uplink waveform and a downlink waveform.

4. The apparatus of claim 1, wherein the first uplink waveform and the first downlink waveform comprise a same waveform type, the set of uplink resources and the set of downlink resources fully overlapping in the time-domain.

5. The apparatus of claim 1, wherein the first uplink waveform comprises a first waveform type that is different from a second waveform type of the first downlink waveform, the set of uplink resources overlapping with a portion of the set of downlink resources in the time-domain.

6. The apparatus of claim 5, wherein the one or more processors are further configured to:
    transmit one or more repetitions of a physical uplink channel on the set of uplink resources that partially overlap with the set of downlink resources in the time-domain.

7. The apparatus of claim 1, wherein the one or more processors are further configured to:
    modify the first uplink waveform to a second uplink waveform different from the first uplink waveform based at least in part on the first uplink waveform and the first downlink waveform.

8. The apparatus of claim 7, wherein the one or more processors are further configured to:
    receive, from the network device, a message comprising an indication to modify the first uplink waveform to the second uplink waveform, wherein modifying the first uplink waveform to a second uplink waveform is based at least in part on the indication.

9. The apparatus of claim 8, wherein the message is received before modifying the first uplink waveform to the second uplink waveform based at least in part on a time duration before communicating with the network device.

10. The apparatus of claim 9, wherein the one or more processors are further configured to:
    receive, from the network device, a fourth control message that indicates a configuration of the time duration, wherein the fourth control message comprises a RRC message, or a medium access control (MAC)-control element, or any combination thereof.

11. The apparatus of claim 9, wherein the time duration is based at least in part on a capability of the UE to modify the first uplink waveform to the second uplink waveform.

12. The apparatus of claim 7, wherein the first uplink waveform is modified to the second uplink waveform based at least in part on a pathloss of a channel between the UE and the network device for the full-duplex communications satisfying a threshold value.

13. The apparatus of claim 7, wherein the first uplink waveform is modified to the second uplink waveform based at least in part on the frequency-domain gap and a transmission power used for communicating with the network device.

14. The apparatus of claim 1, wherein:
    the first uplink waveform comprises a single-carrier-type waveform or a cyclic-prefix (CP)-orthogonal frequency-division multiplexing (OFDM)-type waveform; and
    the first downlink waveform comprises the single-carrier-type waveform or the CP-OFDM-type waveform.

15. The apparatus of claim 14, wherein the single-carrier-type waveform comprises a discrete Fourier transform (DFT)-spread-OFDM (DFT-s-OFDM) waveform.

16. An apparatus for wireless communication at a network device, comprising:
    one or more memories; and
    one or more processors coupled with the one or more memories and configured to:
        transmit, to a user equipment (UE), a first control message indicating a configuration of a first uplink waveform to be used by the UE for full-duplex communications;

transmit, to the UE, a second control message scheduling a set of uplink resources and a set of downlink resources for the full-duplex communications, the set of uplink resources and the set of downlink resources at least partially overlapping in a time-domain, wherein a frequency-domain gap between the set of uplink resources and the set of downlink resources is based at least in part on a waveform pair of a set of two or more waveform pairs, wherein the waveform pair comprises the first uplink waveform and a first downlink waveform used by the network device; and communicate with the UE on the set of uplink resources and the set of downlink resources in accordance with the frequency-domain gap.

17. The apparatus of claim 16, wherein the one or more processors are further configured to:

transmit, to the UE, a third control message indicating a configuration of a respective frequency-domain gap for each waveform pair of the set of two or more waveform pairs, each waveform pair comprising an uplink waveform and a downlink waveform, wherein the frequency-domain gap for the waveform pair associated with the first uplink waveform and the first downlink waveform is based at least in part on the configuration of the respective frequency-domain gap for each waveform pair.

18. The apparatus of claim 16, wherein the first uplink waveform and the first downlink waveform comprise a same waveform type, the set of uplink resources and the set of downlink resources fully overlapping in the time-domain.

19. The apparatus of claim 16, wherein the first uplink waveform comprises a first waveform type that is different from a second waveform type of the first downlink waveform, the set of uplink resources overlapping with a portion of the set of downlink resources in the time-domain.

20. The apparatus of claim 19, wherein the one or more processors are further configured to:

receive one or more repetitions of a physical uplink channel on the set of uplink resources that partially overlap with the set of downlink resources in the time-domain.

21. The apparatus of claim 16, wherein the one or more processors are further configured to:

modify the first downlink waveform to a second downlink waveform different from the first downlink waveform based at least in part on the first uplink waveform and the first downlink waveform.

22. The apparatus of claim 21, wherein the one or more processors are further configured to:

measure a pathloss for a channel between the network device and the UE associated with the full-duplex communications; and determine that the pathloss satisfies a threshold value, wherein modifying the first downlink waveform to a second downlink waveform is based at least in part on the pathloss satisfying the threshold value.

23. The apparatus of claim 21, wherein the first downlink waveform is modified to the second downlink waveform based at least in part on a power headroom report of the UE.

24. The apparatus of claim 16, wherein the one or more processors are further configured to:

transmit, to the UE, a message comprising an indication to modify the first uplink waveform to a second uplink waveform different from the first uplink waveform based at least in part on the first uplink waveform and the first downlink waveform being different waveform types, the second uplink waveform comprising a same waveform type as the first downlink waveform.

25. The apparatus of claim 24, wherein the message is transmitted before the first uplink waveform is modified to the second uplink waveform based at least in part on a time duration before communicating with the UE, and the one or more processors are further configured to:

transmit, to the UE, a fourth control message that indicates a configuration of the time duration, wherein the fourth control message comprises a RRC message, or a medium access control (MAC)-control element, or any combination thereof.

26. A method for wireless communication at a user equipment (UE), comprising:

receiving, from a network device, a first control message indicating a configuration of a first uplink waveform to be used by the UE for full-duplex communications;

receiving, from the network device, a second control message scheduling a set of uplink resources and a set of downlink resources for the full-duplex communications, the set of uplink resources and the set of downlink resources at least partially overlapping in a time-domain, wherein a frequency-domain gap between the set of uplink resources and the set of downlink resources is based at least in part on a waveform pair of a set of two or more waveform pairs, wherein the waveform pair comprises the first uplink waveform and a first downlink waveform used by the network device; and communicating with the network device on the set of uplink resources and the set of downlink resources in accordance with the frequency-domain gap.

27. The method of claim 26, further comprising:

receiving, from the network device, a third control message indicating a configuration of a respective frequency-domain gap for each waveform pair of a set of two or more waveform pairs, each waveform pair comprising an uplink waveform and a downlink waveform; and identifying the frequency-domain gap associated with the first uplink waveform and the first downlink waveform based at least in part on the configuration of the respective frequency-domain gap for each waveform pair.

28. The method of claim 26, further comprising:

identifying the frequency-domain gap for the waveform pair associated with the first uplink waveform and the first downlink waveform based at least in part on a predefined configuration of a respective frequency-domain gap for each waveform pair of the set of two or more waveform pairs, each waveform pair comprising an uplink waveform and a downlink waveform.

29. The method of claim 26, wherein the first uplink waveform and the first downlink waveform comprise a same waveform type, the set of uplink resources and the set of downlink resources fully overlapping in the time-domain.

30. A method for wireless communication at a network device, comprising:

transmitting, to a user equipment (UE), a first control message indicating a configuration of a first uplink waveform to be used by the UE for full-duplex communications;

transmitting, to the UE, a second control message scheduling a set of uplink resources and a set of downlink resources for the full-duplex communications, the set of uplink resources and the set of downlink resources at least partially overlapping in a time-domain, wherein a frequency-domain gap between the set of uplink resources and the set of downlink resources is based at least in part on a waveform pair of a set of two or more waveform pairs, wherein the waveform pair comprises the first uplink waveform and a first downlink waveform used by the network device; and communicating with the UE on the set of uplink resources and the set of downlink resources in accordance with the frequency-domain gap.

* * * * *